US012575562B2

(12) United States Patent
Favre et al.

(10) Patent No.: US 12,575,562 B2
(45) Date of Patent: Mar. 17, 2026

(54) APPARATUS AND METHOD FOR PROTECTING AGAINST MICROBIAL HAZARDS

(71) Applicant: GMR Labs, LLC, Kiln, MS (US)

(72) Inventors: Scott M. Favre, Kiln, MS (US); A. Louise Perkins, Kiln, MS (US)

(73) Assignee: CINDY LYNN FAVRE REVOCABLE TRUST, Kiln, MS (US)

( * ) Notice: Subject to any disclaimer, the term of this patent is extended or adjusted under 35 U.S.C. 154(b) by 0 days.

(21) Appl. No.: 17/543,265

(22) Filed: Dec. 6, 2021

(65) Prior Publication Data

US 2022/0174945 A1     Jun. 9, 2022

Related U.S. Application Data

(60) Provisional application No. 63/123,206, filed on Dec. 9, 2020, provisional application No. 63/280,909, filed on Nov. 18, 2021.

(51) Int. Cl.
*A01N 25/10* (2006.01)
*A01N 31/08* (2006.01)
*A01N 33/12* (2006.01)

(52) U.S. Cl.
CPC ............. *A01N 25/10* (2013.01); *A01N 31/08* (2013.01); *A01N 33/12* (2013.01)

(58) Field of Classification Search
CPC ......... A01N 25/10; A01N 31/08; A01N 33/12
See application file for complete search history.

(56) References Cited

U.S. PATENT DOCUMENTS

| | | | | |
|---|---|---|---|---|
| 5,595,750 | A | 1/1997 | Jacobson | |
| 7,288,265 | B1 * | 10/2007 | Rolf .................... | A61F 13/0209 424/443 |
| 7,306,777 | B2 * | 12/2007 | Bringley ................ | A01N 25/34 428/323 |
| 9,527,041 | B2 * | 12/2016 | Wiesner ..................... | C08J 5/18 |
| 10,016,537 | B2 * | 7/2018 | Menon ..................... | A61L 31/16 |
| 10,588,314 | B2 * | 3/2020 | Paronen ................. | A01N 25/10 |
| 2010/0119461 | A1 | 5/2010 | Bicard-Benhamou | |
| 2011/0086084 | A1 | 4/2011 | Koenig | |
| 2013/0025764 | A1 * | 1/2013 | Henderson ............... | C09D 5/14 156/60 |
| 2015/0257381 | A1 * | 9/2015 | Ophir ...................... | C09D 7/45 424/404 |
| 2015/0351851 | A1 * | 12/2015 | Deselle .............. | A61B 5/02233 600/490 |
| 2019/0200651 | A1 | 7/2019 | Lim | |
| 2020/0236931 | A1 * | 7/2020 | Trainor .................. | A01N 47/44 |

FOREIGN PATENT DOCUMENTS

| | | |
|---|---|---|
| CN | 104739936 | 7/2015 |
| CN | 106109484 | 11/2016 |
| CN | 107158802 | 9/2017 |
| CN | 110367390 | 10/2019 |
| EP | 677989 B1 * | 9/1998 ............. A01N 25/26 |
| EP | 2732832 A2 * | 5/2014 ............. A61K 47/32 |
| WO | WO-02062142 A1 * | 8/2002 ............. A01N 43/80 |

OTHER PUBLICATIONS

Young-Min Kim, Duck-Soon An, Hyun-Jin Park, Jong-Moon Park and Dong Sun Lee, "Properties of Nisin-incorporated Polymer Coatings as Antimicrobial Packaging Materials", Packaging Technology and Science, 2002, 15, 247-254. (Year: 2002).*

Marta Michalska-Sionkowska, Maciej Walczak and Alina Sionkowska, "Antimicrobial activity of collagen material with thymol addition for potential application as wound dressing", Polymer Testing, 63, 2017, 360-366. (Year: 2017).*

Alejandra Torres et al., "Effect of processing conditions on the physical, chemical and transport properties of polylactic acid films containing thymol incorporated by supercritical impregnation", European Polymer Journal, 89, 2017, 195-210. (Year: 2017).*

İlke Uysal Ünalan, Iskender Arcan, Figen Korel and Ahmet Yemenicioulu, "Application of active zein-based films with controlled release properties to control Listeria monocytogenes growth and lipid oxidation in fresh Kashar cheese", Innovative Food Science and Emerging Technologies, 20, 2013, 208-214. (Year: 2013).*

Boh, Bojana, and Emil Knez. "Microencapsulated antimicrobials on non-woven textiles for shoe insoles." In XVth International Workshop on Bioencapsulation, Vienna, pp. 1-4. 2007. (Year: 2007).*

Donghwan Chung, Spyridon E. Papadakis and Kit L. Yam, "Evaluation of a polymer coating containing triclosan as the antimicrobial layer for packaging materials", International Journal of Food Science and Technology 2003, 38, 165-169. (Year: 2003).*

A. Nostro, R. Scaffaro, M. D'Arrigo, L. Botta, A. Filocamo, A. Marino and G. Bisignano, "Development and characterization of essential oil component-based polymer films: a potential approach to reduce bacterial biofilm", Applied Microbiology and Biotechnology (2013) 97:9515-9523. (Year: 2013).*

Kuorwel K. Kuorwel, Marlene J. Cran, Kees Sonneveld, Joseph Miltz, and Stephen W. Bigger, "Essential Oils and Their Principal Constituents as Antimicrobial Agents for Synthetic Packaging Films", Journal of Food Science vol. 76, Nr. 9, 2011, R164-R177. ( Year: 2011).*

Seema Thakral, Naveen K Thakral & Dipak K Majumdar, "Eudragit®: a technology evaluation", Expert Opinion on Drug Delivery, 10:1, 131-149 (Year: 2012).*

(Continued)

*Primary Examiner* — Mina Haghighatian
*Assistant Examiner* — Nathan W Schlientz
(74) *Attorney, Agent, or Firm* — DUANE MORRIS LLP; Gregory M. Lefkowitz; Brandon A. Chan

(57) ABSTRACT

An antimicrobial material that includes an antimicrobial layer comprising an antimicrobial agent entrapped within a polymer matrix is provided. The polymer matrix is water stable, and an exposed surface of the antimicrobial layer exhibits sustained-release antimicrobial properties for at least 7 days. A composition for forming the antimicrobial material is also provided, as well as, a method of making the antimicrobial material.

20 Claims, 1 Drawing Sheet

(56)                    References Cited

OTHER PUBLICATIONS

D. Roy and B. R. Gupta, "Rheological Behavior of Short Carbon Fiber-Filled Thermoplastic Elastomer Based on Styrene-Isoprene-Styrene Block Copolymer", Journal of Applied Polymer Science, vol. 49, 1475-1482 (1993) (Year: 1993).*

Huseyin Avci et al., "Flexible poly(styrene-ethylene-butadiene-styrene) hybrid nanofibers for bioengineering and water filtration applications", Journal of Applied Polymer Science, 2020, 137:e49184, 1-13 (Year: 2020).*

Lucik, I., et al., "Antioxidant Activity Of PLA/PCL Films Loaded With Thymol And/Or Carvacrol Using Scco2 For Active Food Packaging," Food Packaging and Shelf Life, Oct. 2020, vol. 26, 100578.

* cited by examiner

APPARATUS AND METHOD FOR PROTECTING AGAINST MICROBIAL HAZARDS

CROSS-REFERENCE TO RELATED APPLICATIONS

This application claims priority to U.S. Provisional Application No. 63/123,206, filed Dec. 9, 2020, the entirety of which is incorporated herein by reference.

FIELD OF THE INVENTION

The disclosure relates generally to materials that provide sustained antimicrobial properties.

BACKGROUND

In the age of COVID-19, people appreciate the risk pathogens in the environment pose more than ever. The ability to minimize the risk one will contract COVID-19 or another opportunistic pathogen is highly desired. Many people carry hand sanitizer and sanitizing wipes, and companies wipe down high contact surfaces regularly. These, and other approaches, can certainly mitigate the risk of contracting COVID-19 or other opportunistic pathogens.

SUMMARY

An antimicrobial material that includes an antimicrobial layer comprising an antimicrobial agent entrapped within a polymer matrix is provided. The polymer matrix is water stable, and an exposed surface of the antimicrobial layer exhibits sustained-release antimicrobial properties for at least 7 days.

A composition for forming the antimicrobial material is also provided.

A method of making the antimicrobial material is provided as well.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
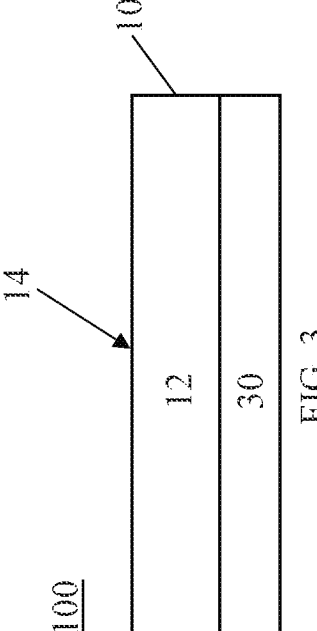
FIG. 1 is a cross-sectional view of an antimicrobial material according to some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting components together either mechanically (e.g., bonded, joined, etc.) or otherwise, such that the connection allows the pertinent devices or components to operate with each other as intended by virtue of that relationship.

Turning to the drawings, FIGS. 1-4 illustrate an antimicrobial material 10 that includes an antimicrobial layer 12 comprising an antimicrobial agent entrapped within a polymer matrix, where the polymer matrix is water stable. An exposed surface 14 of the antimicrobial layer 12 exhibits sustained-release antimicrobial properties for greater than 7 days.

As used herein, "water stable" refers to a composition (e.g., a polymer matrix) that is less than 5 wt-% soluble in room temperature (~23° C.) deionized (DI) water after 24 hours. In some embodiments, the water stable composition can be less than 2.5 wt-% soluble, or less than 1 wt-% soluble in room temperature DI water after 24 hours. Of particular interest, a water stable polymer matrix does not dissolve to rapidly release the antimicrobial agent upon interaction with water.

In some instances, the exposed surface 14 of the antimicrobial layer 12 exhibits an area of inhibition of bacteria of at least 1.05 (inhibition area/film dimension) within 20 hours of exposure of the area to cultured bacteria (i.e. *E. coli* grown on agar in petri dish) after at least 7 days. In some embodiments, the area of inhibition is at least 1.10 or at least 1.15, or at least 1.20 within 20 hours of exposure to the area to cultured bacteria after at least 7 days.

In some embodiments, at least one surface 16 of the antimicrobial material 10 comprises adhesive 18 adapted to adhere the antimicrobial material 10 to a touchable surface, such as a substrate 30. In some embodiments, a surface 16 of the antimicrobial material 10 opposite the exposed surface 14 comprises adhesive 18 adapted to adhere the antimicrobial material 10 to a touchable surface 14. In some embodiments, the adhesive 18 is covered with a removeable peel strip 20.

In some embodiments, the antimicrobial layer 12 comprises the antimicrobial agent in an amount ranging from 0.01 to 50 wt-% based on the weight of the antimicrobial layer 12. In some embodiments, the antimicrobial layer 12 includes an antimicrobial agent in an amount of at least 1 wt-%, at least 2 wt-%, at least 5 wt-%, or at least 10 wt-% based on the weight of the antimicrobial layer 12. In some embodiments, the antimicrobial layer 12 includes an antimicrobial agent in an amount ranging from 5 to 50 wt-%, or 10 to 30 wt-%, or 15 to 25 wt-% based on the weight of the antimicrobial layer 12.

Figure 2:
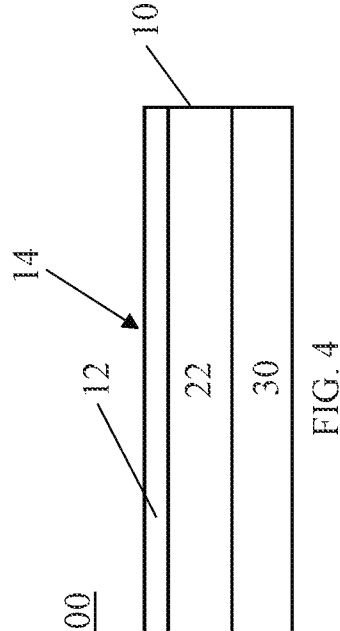
FIG. 2 is a cross-sectional view of a second antimicrobial material according to some embodiments.
Figure 3:
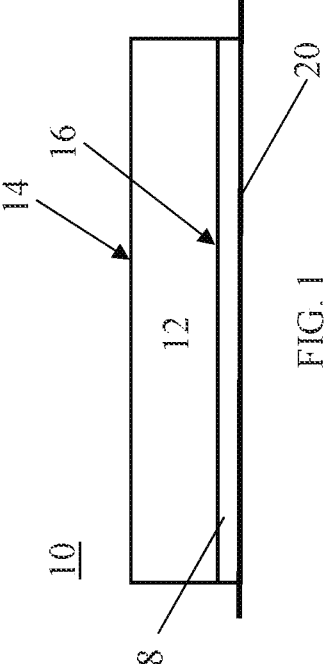
FIG. 3 is a cross-sectional view of an antimicrobial material coupled to a substrate according to some embodiments.
Figure 4:
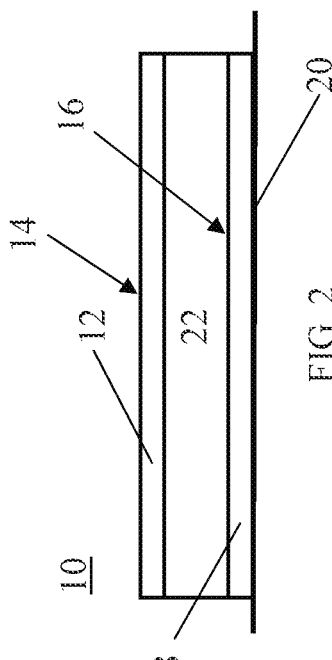
FIG. 4 is a cross-sectional view of a second antimicrobial material coupled to a substrate according to some embodiments.

In some embodiments, as shown in FIGS. 2 and 4, the antimicrobial material includes one or more additional layers 22. In some embodiments, the one or more additional layers 22 have a different composition than the antimicrobial layer 12. In some embodiments, the one or more additional layers 22 do not include the antimicrobial agent.

In some embodiments, the antimicrobial agent is selected from the group consisting of thymol, quaternary salts, eugenol, benzylalkonium chloride, Nisin, chlorohexidine, ginger oil, clove bud oil, cinnamaldehyde, potassium chlorate, curcumin, linalool, carvacrol, magnolol, ferruginol, citral, doxycycline, niclosamide, and valinomycin, lignins, terpenes, and combinations thereof.

In some embodiments, the antimicrobial agent is thymol. In some embodiments, the antimicrobial layer 12 comprises thymol in an amount ranging from 0.01 to 40 wt-% based on the weight of the antimicrobial layer 12. In some embodiments, the antimicrobial layer 12 includes thymol in an amount of at least 1 wt-%, at least 2 wt-%, at least 5 wt-%, or at least 10 wt-% based on the weight of the antimicrobial layer 12. In some embodiments, the antimicrobial layer 12 includes thymol in an amount ranging from 5 to 35 wt-%, or 10 to 30 wt-%, or 15 to 25 wt-% based on the weight of the antimicrobial layer 12.

In some embodiments, the quaternary salt is benzalkonium chloride.

In some embodiments, the lignin is selected from the group consisting of magnolol, ferruginol, hinokinin.

In some embodiments, the antimicrobial agent comprises one or more essential oils.

In some embodiments, the antimicrobial agent comprises thymol and chlorohexidine. In some embodiments, the chlorohexidine is present in an amount ranging from 1 to 20 wt-% based on the weight of the antimicrobial layer 12.

In some embodiments, the polymer matrix comprises a polymer selected from the group consisting of chitosan, poly(caprolactone), poly(vinyl alcohol), poly(vinylacetate), poly(ethylene-co-vinyl alcohol), gelatin, polyaminoacids, poly(lactic acid), methylcellulose, zein, poly(vinyl chlorides), poly(hydroxyethylmethacrylates), poly(methacrylates), 2-Methylprop-2-enoic acid-N,N-dimethylmethanamine, polyesters, polystyrene, polyisoprene, poly(butadiene), poly(ethylene-ran-butylene), polymers of mono- or disaccharides, copolymers thereof, block copolymers thereof, and combinations thereof.

In some embodiments, the polymer matrix comprises a block copolymer comprising polystyrene. In some embodiments, the block co-polymer can be a biopolymer, a terpolymer, a quaterpolymer, or an n-polymer.

In some embodiments, the polymer matrix comprises a block copolymer selected from the group consisting of polystyrene-block-poly(ethylene-ran-butylene), polystyrene-block-polyisoprene, and polystyrene-block-polybutadiene.

In some embodiments, the antimicrobial material exhibits sustained-release antimicrobial properties for greater than 10 days, or greater than 14 days, or greater than 20 days, or greater than 30 days.

In some embodiments, the antimicrobial layer 12 has a thickness ranging from 0.25 mm to 10 mm. In some embodiments, the antimicrobial layer 12 has a thickness ranging from 0.5 mm to 8 mm, or 1 mm to 6 mm.

In some embodiments, the antimicrobial material 10 has a thickness ranging from 0.5 mm to 15 mm. In some embodiments, the antimicrobial layer 10 has a thickness ranging from 1 mm to 10 mm, or 2 mm to 8 mm.

In some embodiments, the antimicrobial layer further comprises a plasticizer, an additive, or a sustained-release enhancer (e.g., cinnamaldehyde with thymol). In some embodiments, the additive is selected from the group consisting of glycerol, gelatin, lactic acid, and poly(ethylene glycol). Furthermore, sustained-release can be enhanced using multiple types of polymers, co-polymers, or block-copolymers thereof. In particular, block combinations of polystyrene with polyethylene-ran-butylene and/or polybutadiene as block copolymers of each other. It has been observed that such block copolymers can improve sustained release of an active agent when compared to homopolymers.

In some embodiments, the antimicrobial material comprises a substrate 30, wherein the antimicrobial layer 12 is coupled to at least one surface of the substrate 30. In some embodiments, as in FIG. 4, the antimicrobial layer 12 is indirectly coupled to at least one surface of the substrate 30 (e.g., via additional layer(s) 22). In some embodiments, as in FIG. 3, the antimicrobial layer 12 is directly coupled to the at least one surface of the substrate 30.

In some embodiments, the antimicrobial layer 12 is coupled to the surface of the substrate 30 by adhesive. In some embodiments, the antimicrobial layer 12 is formed on the surface of the substrate 30 or is otherwise coupled to the substrate 30

In some embodiments, the substrate 30 is an outer surface of an object selected from the group consisting of a phone case, phone cover, a facial tissue holder, a toilet seat, a handle, a door knob, a steering wheel, a steering wheel cover, a furniture surface, a wall surface, a cigarette case, a bed rail, a bed frame, a lamp, a tray table, an IV pole, a blood pressure cuff, and an airplane, train, or bus interior surface. In some embodiments, the handle can be selected from a door handle, a drawer handle, a cabinet handle, a faucet handle, a flush handle.

In some embodiments, the sustained-release antimicrobial properties are selected from the group consisting of antibiotic properties, antiviral properties, antifungal properties, antiparasitic properties, and combinations thereof.

A film-forming composition is also provided. The film-forming composition can include a mixture comprising a solvent, an antimicrobial agent, and polymeric material. When sprayed onto a surface, the mixture forms an antimicrobial layer as described herein. In some embodiments, the polymer material is dissolved in the solvent. In some embodiments, the antimicrobial agent is dissolved in the solvent.

In some embodiments, the solvent comprises a fluid selected from the group consisting of isopropyl alcohol, ethanol, acetone, toluene, dichloromethane, methanol, aqueous lactic acid, aqueous acetic acid, and combinations thereof.

In some embodiments, the mixture further comprises a sustained-release enhancer.

A method of making an antimicrobial material as described herein is also provided. The method can include providing a mixture comprising a solvent, an antimicrobial agent, and polymeric material; applying the mixture onto a surface; and evaporating the solvent. After evaporation, the mixture forms an antimicrobial layer as described herein on the surface. The substrate can be any substrate, including those previously described herein.

An antimicrobial material as described herein, where the polymer matrix is water stable and comprises polystyrene, polyisoprene, or both is also provided. In some such embodiments, the polymer matrix comprises a block copolymer selected from the group consisting of polystyrene-block-poly(ethylene-ran-butylene), polystyrene-block-polyisoprene, and polystyrene-block-polybutadiene. In some such embodiments, the antimicrobial material exhibits sustained-release antimicrobial properties for greater than 14 days.

The antimicrobial materials described herein are intended to provide long-lasting antimicrobial properties. They can be incorporated onto high-touch surfaces like door handles and cell phone cases. Such placement of the antimicrobial materials can help prevent transmission of bacteria and viruses, which can help prevent the spread of disease, such as COVID-19. In some instances, when a virus comes into contact with the antimicrobial materials, the active agent can be present at the surface of the antimicrobial material at such a concentration that the virus is inactivated, which will prevent transmission from the surface to a person that touches the surface. By providing sustained release, the antimicrobial properties are long lasting and the antimicrobial material needs to be replaced less frequently. In addition, because the antimicrobial materials are water stable, the antimicrobial materials can be used outdoors or in other environments where they may encounter water, sweat, or spills.

EXAMPLES

Examples provided below are results from laboratory testing. The below listing indicates equipment and reagents used in this research. In the methods section, the manufacturer information will be referenced as appropriate for that portion. Unless otherwise specified the indicated piece of equipment or reagent is what was used in the research.
Equipment (MFG—Model #)
    Analytical balance (Ohaus, Explorer model EX224)
    RO water system (Pall, Cascada)
    UV-Vis Spectrophotometer (Thermofisher, Genesys 10S)
    Orbital agitating incubator (Southwest science, IncuShaker Mini)
    Biosafety Hood (Esco, Labculture® Class II Type A2)
    Incubator (VWR Symphony Model 3405)
Supplies/Reagents (MFG-Cat #, acronym)
    20 mL scintillation vials (Fisher Scientific)
    Chitosan (Aldrich, #448869, Chit)
    Lactic acid (88%, FG Birko, LA)
    Poly(caprolactone) (80 kDa, Aldrich #440744, PCL)
    Acetone (Fisher Scientific #A18-20, ACE)
    Isopropanol (Fisher Scientific #A416-20, IPA)
    Poly(vinyl alcohol)(Aldrich #360627, PVA 9 kDa-80 DA)
    Polyvinyl acetate (Aldrich #189480, PVAc-100 kDa)
    Poly(ethylene-co-vinyl alcohol) (Aldrich #181072. PEVA)
    Methylcellulose (Aldrich #18804-2, Methocel)
    Eudragit (Evonik, RL100, EUD)
    Polylactide (Evonik, Resomer R207S)
    Polyethylene-co-vinyl acetate Film (3M, Co-tran 9702)
    50% Benzylalkonium chloride solution (Millipore Cat #8.14858.1000, BZK)
    Phosphate buffered saline plus 0.05% Tween-20 (Aldrich #P3563, PBST)
    Eugenol (Aldrich # E51791, EUG)
    1-Hydroxycyclohexyl phenyl ketone (Aldrich #405612, Irgacure 184)
    Ethylene glycol dimethacrylate (Aldrich #335681, EGDMAC)
    Hydroxyethylmethacryalte (Aldrich #477028, HEMA)
    Thymol (Aldrich # W306606)
    Ginger Oil (Aldrich # W252204)
    Clove Bud Oil (Aldrich # W232300)
    Nisin (Aldrich # N5764)
    Potassium Chlorate (Aldrich #255572)
    Adhesive Backed Film (Grafix, Dur-a-lar 0.005", Blick #55525-2020)
    Cinnamaldehyde (Aldrich # W228613)
    Linalool (Aldrich #L2602)

Carvacrol (Aldrich #W224502)
    Citral (Aldrich #W230316)
    Gelatin (Gelita, 250 bloom, pharmaceutical)
    Doxycycline Hyclate (Aldrich # D9891)
    Mueller Hinton agar (Sigma Aldrich, Cat #70191-100G)
    Mueller Hinton broth (Sigma Aldrich 70192-100G)
    *Escherichia coli* (ATCC® 10798)
    *Staphylococcus epidermidis* (ATCC®14990)
    Petri dishes (Falcon 100×15 mm Cat #351029)
    Zein (Aldrich Cat # Z3625)
    Glycerol (Fisher cat # BP229-1)
    Ethanol (200 Proof, Decon Labs)
    Poly(vinyl chloride) (PVC, Aldrich cat #389293)
    Chitosan (medical) (MP Biomedical Cat #150597)
    Poly(vinyl alcohol) (cold-water soluble) (Himedia Cat # GRM6170)
    Polystyrene-block-polybutadiene-block-polystyrene (Aldrich Cat #432490) (PSBS)
    Polystyrene-block-poly(ethylene-ran-butylene)-block-polystyrene (Aldrich Cat #200557, Mw~118,000 by GPC, contains >0.03% antioxidant as inhibitor) (PSEBS)
    Polystyrene-block-polyisoprene-block-polystyrene (Aldrich Cat #432407, styrene 17 wt. %, Mn 1900 Da) (PSIS)
    Artificial Skin (IMS, Vitro Skin, cat # N-19)
    Polyisobutylene (Aldrich cat #181455, average Mw 500, 000, average Mn 200,000 by GPC/MALLS, average Mv ~420,000)
    Polybutadiene (Aldrich cat #181382, average Mw 200, 000)
    Polystyrene (Aldrich cat #331651, average Mw 35,000)
    Polyisoprene (Aldrich cat #431257, cis-isomer, average Mw 38,000 by GPC, made from natural rubber)

Note that the first time a reagent or piece of equipment is used relevant manufacturers information is included. Unless otherwise specified, this is the same item or material used in the remainder of this application.
Methods
Release Assay The release assay was used to evaluate the amount of antimicrobial agent released from a film over time. Each test sample was loaded into the well of a 6-well plate (Falcon, tissue culture plate). Each day, 3 ml of phosphate buffered saline with tween 20 ("PBST" Aldrich cat # P3563 reconstituted according to manufacturer instructions) was added to each sample well and gently agitated at room temperature (~22° C.) for 5 minutes on an orbital shaker. The PBST was withdrawn and stored for analysis while the samples were left overnight 16 hours) at room temperature. The release test evaluation was then repeated the next business day. As this is an intermittent release condition, the data is recorded according to number of extractions rather than time. In order to assay various actives for their release by UV-Visible spectroscopy (Genesys-10S, Thermo-Fisher), the optimal peak wavelength was identified and a calibration curve generated from this wavelength. For this, each compound was serially diluted in PBST to obtain a range of solutions in the ug/ml to mg/ml range of concentrations as appropriate for the compounds solubility, A representative standards solution for each sample was scanned by UV-Vis absorbance spectrophotometer in the range of 190-900 nm and the highest wavelength peak was displaying strong absorbance selected from this scan. A series of standards of known concentration were measured for UV-Vis absorbance at this wavelength and this information was used to calculate a calibration curve using Microsoft Excel (Linear, forced curve X,Y=0,0). The compound calibrations and wavelengths are listed below:

Doxycycline Hyclate (360 nm): (ABS)=0.0238*DOX(μg/ml) (R2=0.9999)

Benzylalkonium Chloride (264 nm): (ABS) 0.8101*BZK (mg/ml) (R2=0.9978)

Chlorohexidine Digluconate (255 nm): (ABS)= 29.143*CHX(mg/ml) (R2=0.9976)

Cinnamaldehyde (292 nm): (ABS) 122.2*Cinn(mg/ml) (R2=0.9946)

Eugenol (280 nm): (ABS)=0.01144*EUG(μg/ml) (R2=0.9994)

Nisin (204 nm): (ABS)=1.3259*Nisin(mg/ml) (R2=0.9944)

Thymol (274 nm): (ABS) 6.4183*Thymol(mg/ml) (R2=0.9981)

Citral (244 nm): (ABS)=62.707*Citral(mg/ml) (R2=0.9980)

The various examples listed for their release were tested according to this method. For the samples a control article (same carrier-polymer formulation without the antimicrobial agent) was tested following the same protocol as the test article and the absorbance of the control was subtracted from that of the test article to eliminate matrix and background variability. In the situation where this resulted in a negative absorbance, the release quantity was set as zero because the test sample did not have a higher absorbance than the control article.

For samples containing multiple active agents, the UV-Vis spectra was collected. However, the individual active content was not quantified due to overlap between the various agents.

Bacterial In-Vitro Trials Development

A biological hood and incubator were sterilized and prepared for work with bacterial strains. Mueller Hinton agar (Sigma Aldrich, Cat #70191-100G) and Mueller Hinton broth (Sigma Aldrich 70192-100G) were prepared per manufacturer instructions. Bacterial strains of *Escherichia coli* (ATCC® 10798) and *Staphylococcus epidermidis* (ATCC®14990) were used. The bacteria were received as freeze dried pellets and were rehydrated in Meuller Hinton broth upon arrival. The bacteria were subsequently transferred to culture flasks and incubated at 37° C. in an aerobic environment in an incubator (VWR Symphony Model 3405). The *E. coli* strain demonstrated rapid growth in Meuller Hinton broth. The vials of *Staphylococcus epidermidis* utilized in the study also grew. After establishing rapid healthy growth of *E. coli*, petri dishes (Falcon 100×15 mm Cat #351029) containing 25 mL of Mueller Hinton agar were inoculated with broth culture. The petri dishes were prepared by pipetting small amounts (~1 mL) of broth culture onto the petri plate and tipping the plate back and forth to wet the entire surface. The broth was then removed via pipette. The experiment was conducted using 1" Duralar® circular prototypes. Agar plates were inoculated with bacteria using the pipette method described above. Circular polymer discs with active thymol formulations and blank discs with only polymer were placed on top of the inoculated agar plates with forceps. Discs were firmly pressed onto surface to make good contact with the agar. As necessary, the discs were applied with a piece of circular glass coverslip to ensure they are flat enough for good contact to the agar plate. All tests after initial design setup used diluted (1:7500) nutrient broth from active bacterial cultures. The diluted bacterial broth cultures were used to inoculate agar plates prior to placing prototypes on surface. The dilute broth was selected in order to provide a meaninful evaluation of the antimicrobial effects of the prototypes. To quantify the results, the photograph image of the bacterial assay was measured to obtain the diameter of the applied test article and the resultant diameter of bacterial inhibition ring. For this ring definition, scattered individual colonies were ignored up to the ring edge of high bacterial growth. The diameter of the inhibition zone was divided by the diameter of the circular test article to provide a ratio of the area inhibited.

Example 1. Film Forming

For the following examples, a series of solutions were prepared as follows:

"2% Chitosan"—0.2761 g Chitosan (Aldrich, Cat #448869) added to 13.7953 g of 2% (v/v, lactic acid 88% Birko/Reverse osmosis purified water from Cascada Pall RO system, "RO water")

"10% PCL"—1.0150 g Poly(caprolactone) (80 kDa, Aldrich #440744)+13.19 g acetone (Fisher)

"6% PVA"—0.5820 g poly(vinyl alcohol)(Aldrich #360627)+10.08 g RO water

"10% PVAc"—1.0753 g polyvinyl acetate (Aldrich #189480)+12.04 g acetone

"20% PEVA"—2.0987 g poly(ethylene-co-vinyl alcohol) (Aldrich #181072)+13.54 g tetrahydrofuran (THF)

"5% Methocel"—0.5328 g methylcellulose (Aldrich #18804-2)+10.03 g RO water

"20% Eudragit"—2.0433 g Eudragit (Evonik, RL100)+ 14.06 g isopropyl alcohol (IPA)+0.3743 g RO H₂O "10% PLA"—1.0517 g PLA (Evonik, Resomer R207S)+ 12.20 g Acetone "25/3% BZK/PVA."—Diluted 1 ml of 50% Benzylalkonium chloride solution (Millipore Cat #8.14858.1000) with 1 ml of prepared 6% PVA solution to form drug-loaded precursor.

Prototype 825A was prepared by mixing 1.5 ml of 10% PLA/Acetone with 24 μl of 25/3% BZK/PVA. The mixture initially separated, but vortex stirring (Southwest Science) allowed the two materials to emulsify together. A small amount of solution (~0.3 ml) was dripped onto a cut piece of steel sheet metal. The control was prepared by dripping a small amount of 10% PLA (no BZK/PVA) onto a cut piece of steel sheet metal and both pieces were dry under room conditions.

Observations—Both pieces were observed to dry to form films that were well adhered to the surface of the steel.

Example 2. Heat-Sealable Film Backing

Applied heat-sealable film (3M Cotran 9702) to steel piece at 100° C. observed it melts well to the surface. Pipetted PCL-10% solution in between the Cotran film and a piece of sheet metal. Solution observed to warp the Cotran film and flake from the surface. Pipetted 5% Methocel solution in between cotran film and piece of sheet metal. Observed sandwiched solution to not be dry after at least 3 days of drying under room conditions.

Observations—The Cotran film could be melt-sealed onto metal however interacted with the solution used for creating a sandwich layer.

Example 3. Benzalkonium Chloride

Prepared a series of benzalkonium chloride loaded samples as well as unloaded control samples to test for sustained-release as follows. The listed prototype was made using the above listed solutions. Each sample was vortexed in a 2 ml centrifuge tube to mix and 0.250 ml was pipetted onto a glass coverslip. The films were allowed to dry over three days at ambient conditions.

"828SMS-A"—1 ml 2% chitosan+0.33 ml 6% PVA (Control)

"828SMS-B"—1 ml 2% chitosan+0.33 ml 6% PVA+22 ul 25/3% BZK/PVA

"828SMS-C"—1.5 ml 20% eudragit (Control)

"828SMS-D"—1.5 ml 20% eudragit+24 ul 25/3% BZK/PVA

"828SMS-E"—1.5 ml 6% PVA (Control)

"828SMS-F"—1.5 ml 6% PVA+24 ul 25/3% BZK/PVA

"828SMS-G"—1.5 ml 5% Methocel (Control)

"828SMS-H"—1.5 ml 5% Methocel+24 ul 25/3% BZK/PVA

"828SMS-I"—1.5 ml 10% gelatin (Control)

"828SMS-J"—1.5 ml 10% gelatin+24 ul 25/3% BZK/PVA

"828SMS-K"—1.25 ml 6% PVA+1.25 ml 5% Methocel (Control)

"828SMS-L"—1.25 ml 6% PVA+1.25 ml 5% Methocel+24 ul 25/3% BZK/PVA

"828SMS-M"—1.25 ml 2% chitosan+1.25 ml 5% Methocel (Control)

"828SMS-N"—1.25 ml 2% chitosan+1.25 ml 5% Methocel+24 ul 25/3% BZK/PVA

"828SMS-O"—1.25 ml 2% chitosan+1.25 ml 6% PVA (Control)

"828SMS-P"—1.25 ml 2% chitosan+1.25 ml 6% PVA+24 ul 25/3% BZK/PVA

These were evaluated for release of benzylalkonium chloride using the release assay. Table 3 below shows the results.

TABLE 3

Release of Benzylalkonium Chloride from indicated sample.

| | | μg BZK released/day Extraction number | | | | | |
| Carrier Polymer | Prototype | 1 | 2 | 3 | 4 | 5 | 6 |
| --- | --- | --- | --- | --- | --- | --- | --- |
| Chitosan:PVA (3:1) | 828SMS-B | 0 | 106 | 1 | 0 | 0 | 0 |
| Eudragit | 828SMS-D | 0 | 22 | 0 | 14 | 0 | 6 |
| PVA | 828SMS-F | 305 | 19 | 0 | 0 | 18 | 11 |
| Methylcellulose | 828SMS-H | 0 | 1 | 7 | 7 | 6 | 0 |
| Gelatin | 828SMS-J | 35 | 0 | 0 | 0 | 0 | 0 |
| PVA:Methylcellulose (1:1) | 828SMS-L | 0 | 69 | 1 | 0 | 0 | 2 |
| Chitosan:Methylcellulose (1:1) | 828SMS-N | 0 | 167 | 1 | 9 | 0 | 0 |
| Chitosan:PVA (1:1) | 828SMS-P | 0 | 27 | 2 | 21 | 0 | 2 |

Example 4

Prototype solutions were prepared by combining Thymol with a variety of polymer solutions in 2 mL microfuge tubes. The tubes were capped and vortexed ~30 seconds each, then placed on a shaker tray at room temperature until dissolved. Prototype solution preparation:

"904-A": (Control) 0.5 mL 6% PVA+0.5 mL 2% Chitosan+0.1 mL ethanol

"904-B" 10 mg Thymol 0.5 mL 6% PVA+0.5 mL 2% Chitosan+0.1 mL ethanol (for dissolving Thymol)

"904-C" 25 mg Thymol+0.5 mL 6% PVA+0.5 mL 2% Chitosan+0.1 mL ethanol (for dissolving Thymol)

"904-D" (Control) 1 mL 20% PEVA

"904-E" 10 mg Thymol+1 mL 20% PEVA

"904-F" 25 mg Thymol+1 mL 20% PEVA

"904-G" (Control) 1 mL 10% PVAc

"904-H" 10 mg Thymol+1 mL 10% PVAc

"904-I" 25 mg Thymol+1 mL 10% PVAc

"904-J" (Control) 1 mL 10% PLA

"904-K" 10 mg Thymol+1 mL 10% PLA

"904-L" 25 mg Thymol+1 mL 10% PLA

"904-M" (Control) 1 mL 20% Eud+0.2 mL PEG 400

"904-N" 10 mg Thymol+1 mL 20% Eud+0.2 mL PEG 400

"904-O" 25 mg Thymol+1 mL 20% Eud+0.2 mL PEG 400

"904-P" (Control) 1 mL 10% PCL

"904-Q" 10 mg Thymol+1 mL 10% PCL

"904-R" 25 mg Thymol+1 mL 10% PCL

"909-A" (Control) 1 mL PDMS (Sylgard 184, prepared according to manufacturer instructions)

"909-D" 10 mg Thymol+1 mL PDMS (Sylgard 184)

"909-E" 25 mg Thymol+1 mL PDMS (Sylgard 184)

"910-A" (Control) 1 mL 20% Eudragit

"911-A" 25 mg Thymol+1 mL 20% Eudragit

A volume (0.3 mL) of each sample (904-A through 911-A) was pipetted onto a series of 1" adhesive-backed Duralar circles and allowed to dry overnight at room temperature. The following day, the integrity of the films was evaluated by using the thumb and forefinger to bend the disks back and forth. Samples that were unable to tolerate flexion were discarded and discontinued. The adhesive backing on each of the usable samples was exposed, and the film disks were adhered, one per well, in the bottom of a 6-well plate and tested according to the Release Assay. The results are found below in Table 4.

TABLE 4

Thymol release from indicated samples.

| | μg Thymol released/Extraction | | | | | | | | | | | | | | |
| Prototype | 1 | 2 | 3 | 4 | 5 | 6 | 7 | 8 | 9 | 10 | 11 | 12 | 13 | 14 | 15 |
| --- | --- | --- | --- | --- | --- | --- | --- | --- | --- | --- | --- | --- | --- | --- | --- |
| 904-B | 206 | 58 | 21 | 8 | 3 | 1 | 3 | 2 | 0 | 1 | 2 | 0 | 0 | 2 | 1 |
| 904-C | 229 | 198 | 6 | 0 | 4 | 2 | 1 | 2 | 0 | 4 | 1 | 1 | 2 | 2 | 1 |
| 904-E | 29 | 40 | 40 | 36 | 30 | 28 | 40 | 23 | 19 | 25 | 22 | 18 | 18 | 35 | 15 |
| 904-F | 58 | 102 | 101 | 75 | 77 | 64 | 74 | 38 | 31 | 38 | 38 | 37 | 47 | 85 | 34 |
| 904-H | 5 | 13 | 19 | 21 | 9 | 7 | 8 | 16 | 10 | 9 | 13 | 9 | 8 | 13 | 7 |
| 904-I | 9 | 30 | 34 | 29 | 25 | 23 | 23 | 18 | 15 | 10 | 19 | 16 | 107 | 36 | 14 |
| 904-K | 0 | 4 | 0 | 1 | 4 | 5 | 4 | 1 | 3 | 0 | 9 | 2 | 1 | 2 | 3 |
| 904-L | 4 | 11 | 17 | 13 | 10 | 10 | 9 | 6 | 7 | 6 | 2 | 8 | 5 | 7 | 5 |
| 904-N | 50 | 32 | 41 | 31 | 27 | 19 | 19 | 20 | 17 | 15 | 33 | 10 | 11 | 12 | 12 |
| 904-O | 53 | 75 | 96 | 79 | 75 | 55 | 56 | 55 | 37 | 39 | 66 | 33 | 35 | 38 | 37 |

TABLE 4-continued

Thymol release from indicated samples.

µg Thymol released/Extraction

| Prototype | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 909-D | 6 | 12 | 10 | 6 | 5 | 6 | 9 | 4 | 4 | 5 | | | | | |
| 909-E | 6 | 9 | 7 | 5 | 5 | 4 | 8 | 3 | 3 | 3 | | | | | |
| 911-A | 103 | 132 | 116 | 61 | 52 | 73 | 71 | 70 | 61 | 5 | | | | | |

Example 5. Microparticle-Spray Development

An in-situ, emulsion-based microparticle (MP) preparation was prepared within a carrier fluid. Particle-forming Polymer solutions used were 20% Eudragit, 20% PEVA, and 10% PVAc. Solutions of 5 mL of 0.5% Chitosan/0.5% PVA in 2% lactic acid were pipetted into 20 mL scintillation vials. An overhead mixer paddle was inserted into the Chitosan/ PVA solution and turned at ~1200 RPM. 1 mL of the test polymers was injected through a disposable syringe with an 18G needle under the surface of the Chitosan/PVA solution while stirring. The stirring was continued for ~1 hour each, then small stir bars were added to each vial and stirred at 600 RPM. The vials were covered and allowed to continue stirring overnight. The next day, the only polymer that seemed to make successful microparticles was the Eudragit solution. The PVAc clumped together in one lump, and the PEVA formed a fluffy foam-like slurry. 1 mL of the Eudragit MP solution was combined with 10 mL 2% lactic acid to make a 1:10 dilution. 0.30 mL of the Eud MP solution was pipetted into one well of a 6-well plate for use as a control sample. The well plate was covered and dried at room temperature. The rest of the MP solution was transferred to a bottle with spray nozzle. A glass microscope slide was held perpendicular to the spray-path, approximately 10 inches from the spray head. Two sprays were dispensed. The slide was placed under an inverted cardboard tray to dry at room temperature. Afterwards the slides were observed using a microscope and observed to have a thin polymer layer with microparticles embedded inside.

Example 6. Thymol-Loaded Microparticle Spray

A thymol loaded microparticle-based spray system was created by dissolving 200.8 mg Thymol into 1 mL 20% Eudragit/ethanol, creating a 1:1 Thymol:Eudragit solution. This solution was injected through an 18G needle into a vial containing 5 mL Chitosan/PVA solution stirring at ~1200 RPM. This solution was allowed to continue stirring for ~1 hour, then moved to a magnetic stir plate with stir bar at 600 RPM overnight. The resulting solution was fully opaque and white in color with a low viscosity. Two spray-formulation prototypes were created using Thymol/Eudragit MPs: the samples were made using 1:5 (prototype "922-C") and 1:10 ("922-B") Thymol/Eudragit: 2% Lactic acid. These solutions were sprayed onto separate microscope slides and pipetted into 6-plate wells as was done with the Eudrigit MP control sample. After spraying, the samples were covered, then dried at room temperature. The results of sustained-release testing using these samples is shown below in Table 5.

TABLE 5

Sustained-release results from spray formulations

| Eudragit MP Spray | vial ID | ratio Thymol:Eud | Thymol released (ug) 1 | 2 | 3 | 4 |
|---|---|---|---|---|---|---|
| | 922-B | 1:10 | 2 | 0 | 0 | 0 |
| | 922-C | 1:5 | 32 | 0 | 0 | 0 |

Example 7. Additional Test

In addition to previously described solutions, the following were generated.

Zein (19%): 5.005 grams of Zein (Aldrich Cat # Z3625) and 3.014 grams of glycerol (Fisher cat # BP229-1) were dissolved in 26 ml of ethanol with shaking at 60° C./100 RPM in an incubator (Southwest Science) overnight.

PVC: Poly(vinyl chloride) (PVC, Aldrich cat #389293) was mixed as 1.8262 grams PVC with 11.6820 g acetone and shook at 60° C.100 RPM to dissolve.

Chit-PVA-LA (2%): A solution based on chitosan-PVA blend was created. For this 2 ml of lactic acid (Fluka), 2.0243 grams of chitosan (MP Biomedical Cat #150597), and 2.0732 g PVA (Himedia Cat # GRM6170) were dissolved together in 100 ml of reverse osmosis purified water. This solution was stirred overnight with an overhead stirrer at 350 RPM. The next day the solution was transferred to a shaking incubator (60° C./120 RPM) for 2 hours to finalize dissolution.

The following prototypes (Table 6) were prepared using vortex mixing as previously described. 0.3 mL of each sample was pipetted onto series of 1" adhesive-backed Duralar circles and allowed to dry overnight at room temperature. The following day, the integrity of the films was evaluated by using the thumb and forefinger to bend the disks back and forth. Samples that were unable to tolerate flexion were discarded and discontinued. For the samples that were tested for sustained-release, the adhesive backing on each of these samples was exposed, and the film disks were adhered, one per well, to the bottom of a 6-well plate. Other samples were reserved, adhesive backing left intact, for bacterial observation.

TABLE 6

Prototype example formulations

| Prototype ID | Description | Notes |
|---|---|---|
| 1002-A | 25 mg Thymol in 0.5 mL 2% Chitosan and 0.5 mL 6% PVA | |

TABLE 6-continued

Prototype example formulations

| Prototype ID | Description | Notes |
|---|---|---|
| 1002-B | 50 mg Thymol in 0.5 mL 2% Chitosan and 0.5 mL 6% PVA | |
| 1002-C | 0.5 mL 2% Chitosan and 0.5 mL 6% PVA | |
| 1005-A | 50 mg Thymol in 1 mL 20% PVC | |
| 1005-B | 50 mg Thymol in 1 mL 20% PVC | |
| 1005-C | 50 mg Thymol in 1 mL 20% PVC | |
| 1005-D | 1 mL 20% PVC | |
| 1005-E | 1 mL 20% PVC | |
| 1005-F | 1 mL 20% PVC | |
| 1013-A | 87 mg Thymol in 1 mL Zein | |
| 1013-B | 87 mg Thymol in 1 mL Zein | |
| 1013-C | 87 mg Thymol in 1 mL Zein | |
| 1013-D | Zein (blank) | |
| 1013-E | Zein (blank) | |
| 1013-F | Zein (blank) | |
| 1026-A | 2% Chitosan/2% PVA/2% Lactic acid (blank) | The 1026*-RAI prototypes were discarded due to excessive degradation during first five minutes of soaking in PBST. Prior to that samples 1026-D and E (Thymol with Eugenol) had been discarded because they had failed the flexion test. |
| 1026-B | 50 mg Thymol in 1 mL 2% Chitosan/2% PVA/2% Lactic acid | |
| 1026-C | 100 mg Thymol in 1 mL 2% Chitosan/2% PVA/2% Lactic acid | |
| 1026-D | 25 mg thymol and 25 mg Eugenol in 1 mL 2% Chitosan/2% PVA/2% Lactic acid | |
| 1026-E | 50 mg Thymol and 50 mg Eugenol in 1 mL 2% Chitosan/2% PVA/2% Lactic acid | |

TABLE 6-continued

Prototype example formulations

| Prototype ID | Description | Notes |
|---|---|---|
| 1026-F | 25 mg Thymol and 25 mg Nisin in 1 mL 2% Chitosan/2% PVA/2% Lactic acid | |
| 1026-G | 50 mg Thymol and 50 mg Nisin in 1 mL 2% Chitosan/2% PVA/2% Lactic acid | |
| 1023-A | 50 mg Thymol and 50 mg CHX in 1 mL Zein | Cracked during flexion test; discarded. |
| 1023-B | 50 mg Thymol and 50 mg Eugenol in 1 mL Zein | |
| 1023-C | 50 mg Eugenol and 50 mg CHX in 1 mL Zein | |
| 1023-D | 87 mg Thymol in 1 mL Zein | |
| 1023-E | 100 mg CHX in 1 mL Zein | Cracked during flexion test: discarded. |
| 1023-F | 100 mg Eugenol in 1 mL Zein | |
| 1023-G | 100 mg Thymol in 1 mL Eudragit/IPA/Lactic Acid | |
| 1026J5G-A | 25 mg thymol in 1 ml of 20% Eudragit/IPA dispersed into 9 ml of 2% Chitosan/2% PVA/Lactic acid | |
| 1026JSG-B | 2.5% (w:v) Thymol in 20% Eudragit/IPA/Lactic acid | |
| 1026JSG-C | 1% (w:v) Thymol and 1% (v:v) Eugenol in 2% Chitosan/2% PVA/Lactic acid | Film peeled away from the Duralar backing during flexion test; discarded. |
| 1026JSG-D | 4% (w:v) CHX in 20% Eudragit/IPA/Lactic acid | |

The sustained-release evaluation was performed, and the resultant release was obtained for single-component films as shown below in Tables 7, 8, and 9.

TABLE 7

Thymol release from indicated samples

Thymol release (ug)/extraction

| Sample | 1 | 2 | 3 | 4 | 5 | 6 | 7 | 8 | 9 | 10 | 11 | 12 | 13 |
|---|---|---|---|---|---|---|---|---|---|---|---|---|---|
| 1023-G | 1007 | 0 | 553 | 487 | 396 | 286 | 565 | 544 | 810 | 451 | 530 | 0 | 468 |
| 1026JSG-B | 0 | 203 | 206 | 155 | 0 | 0 | 0 | 117 | 95 | 81 | 0 | 0 | 122 |
| 1013-A | 245 | 401 | 789 | 823 | 709 | 786 | 799 | 663 | 1029 | 900 | 727 | 543 | 608 |
| 1023-D | 495 | 35 | 465 | 175 | 0 | 506 | 598 | 555 | 575 | 0 | 472 | 545 | 175 |

| Sample | 14 | 15 | 16 | 17 | 18 | 19 | 20 | 21 | 22 | 23 | 24 | 25 | 26 |
|---|---|---|---|---|---|---|---|---|---|---|---|---|---|
| 1023-G | 411 | 591 | 685 | 501 | 404 | 221 | 441 | | | | | | |
| 1026JSG-B | 40 | 182 | 173 | 89 | 57 | 51 | 53 | | | | | | |
| 1013-A | 0 | 87 | 407 | 621 | 215 | 356 | 554 | 315 | 291 | 286 | 0 | 538 | 218 |
| 1023-D | 268 | 163 | 892 | 382 | 94 | 176 | 403 | | | | | | |

TABLE 8

Chlorohexidine release from indicated samples

Chlorohexidine release (ug)

| Sample | 1 | 2 | 3 | 4 | 5 | 6 | 7 | 8 | 9 | 10 | 11 | 12 | 13 |
|---|---|---|---|---|---|---|---|---|---|---|---|---|---|
| 1026JSG-D | 196 | 18 | 12 | 55 | 0 | 0 | 16 | 32 | 8 | 8 | 6 | 0 | 8 |

| Sample | 14 | 15 | 16 | 17 | 18 | 19 | 20 | 21 | 22 | 23 | 24 | 25 | 26 |
|---|---|---|---|---|---|---|---|---|---|---|---|---|---|
| 1026JSG-D | 3 | 13 | 15 | 4 | 3 | 6 | 0 | 0 | 0 | 0 | 0 | 0 | 0 |

TABLE 9

Eugenol release from indicated samples

Eugenol release (ug)

| Sample | 1 | 2 | 3 | 4 | 5 | 6 | 7 | 8 | 9 | 10 | 11 | 12 | 13 |
|---|---|---|---|---|---|---|---|---|---|---|---|---|---|
| 1023-F | 380 | 300 | 531 | 356 | 440 | 577 | 541 | 552 | 522 | 194 | 507 | 354 | 115 |

| Sample | 14 | 15 | 16 | 17 | 18 | 19 | 20 | 21 | 22 | 23 | 24 | 25 | 26 |
|---|---|---|---|---|---|---|---|---|---|---|---|---|---|
| 1023-F | 324 | 284 | 0 | 335 | 164 | 0 | 295 | | | | | | |

Select prototypes were tested for bacterial inhibition. The resultant inhibition ratio (ring of inhibition/diameter of test article, a ratio of "0" indicates no inhibition) is shown in table 10 below along with the condition of the test (strain and time of incubation).

TABLE 10

Bacterial inhibition testing results from indicated prototypes

| Prototype | Condition (strain, time of incubation) | Antibacterial area ratio (diameter inhibition zone/diameter test article) |
|---|---|---|
| 1026C-JSG | E. Coli, 20 hours | 1.13 |
| 1026D-JSG | E. Coli, 20 hours | 1.67 |

Example 8. UV-Curable Films

UV-curable coatings were prepared by combining 10 ml of hydroxyethylmethacrylate (HEMA) (Aldrich cat #477028) with 0.1 ml of ethylene glycol dimethacrylate (Scientific Polymer products cat #335681) and dissolving 200 mg of Irgacure 2959 (Aldrich cat #410896). A second solution was prepared following the same method but with 400 mg of Irgacure. 50 mg of thymol were dissolved in 1 ml of each solution and the solutions were cured on surfaces using a UV-lamp (BlackRay B100AP). After one full hour of UV curing, the films were oily to the touch and slid away from the Duralar backing.

Example 9. Touch Testing

Films were prepared by pipetting 200 μL of each of the solutions described in Table 11 (below) onto 22 mm circular glass microscope slide covers. The films were allowed to dry at room temperature overnight. A dean, gloved finger was used to touch each film, once a day, for the next seven business days (Table 11). After seven touches, the films were used for bacterial testing.

TABLE 11

Touch Test formulations and notes

| Sample ID | Active Ingredient(s) | Polymer | Observations |
|---|---|---|---|
| 1021-A | Thymol 25 mg/mL Nisin 25 mg/mL | Eudragit/IPA/ Lactic Acid | Sticky on day 1. After that, gloved finger came away cleanly after each day's touch. |
| 1021-B | Thymol 50 mg/mL | 2% Chitosan/ 2% PVA/2% Lactic Acid | No stickiness |
| 1021-C | Thymol 25 mg/mL Eugenol 25 mg/mL | Eudragit/IPA/ Lactic Acid | Sticky every day. The prototype clung to the gloved finger and had to be pulled away with a pair of tweezers after each day's touch. |
| 1021-D | Thymol 87 mg/mL | Zein | No stickiness |
| 1021-E | CHX 4% (w:v) | Eudragit/IPA/ Lactic Acid | No stickiness |

Select prototypes were tested for bacterial inhibition. The resultant inhibition ratio (ring of inhibition/diameter of test article, a ratio of "0" indicates no inhibition) is shown in table below along with the condition of the test (strain and time of incubation) (Table 12).

TABLE 12

Bacterial inhibition testing results from indicated prototypes

| Prototype (description) | Condition (strain, time of incubation) | Antibacterial area ratio (diameter inhibition zone/diameter test article) |
|---|---|---|
| 1021-C ((Thymol 25 mg/mL/Eugenol 25 mg/mL in Eudragit)) | E. Coli, 20 hours | 1.11 |
| 1021-D (right (Thymol 87 mg/mL in Zein)) | E. Coli, 20 hours | 1.42 |
| 1021-E (CHX 4% in Eudragit) | E. Coli, 20 hours | 1.70 |

Testing on 1021-A and 1021-B was hindered by poor overall growth of the bacteria on the plate.

Example 10. Alcohol-Spray Development

Dissolved 2.00 g Eudragit RL100 into 10 mL 70% isopropyl alcohol/2% lactic acid. The active ingredients were added to this to make each sample solution (Table 13). The sample solutions were sprayed onto 22 mm circular glass slide covers from a distance of approximately 10 inches. The samples were allowed to dry overnight at room temperature. Some of the dried samples were transferred to well-plates for a sustained-release assay; other samples were used for bacterial observation.

TABLE 13

Spray prototype formulations

| Sample | Description |
|---|---|
| 1007-A | 50 mg Thymol in 1 mL 20% Eudragit in IPA with 2% lactic acid |
| 1007-B | 50 mg Thymol in 1 mL 20% Eudragit in IPA with 2% lactic acid |
| 1007-C | 50 mg Thymol in 1 mL 20% Eudragit in IPA with 2% lactic acid |
| 1007-D | 20% Eudragit in IPA with 2% lactic acid |

17

TABLE 13-continued

| | Spray prototype formulations | |
|---|---|---|
| Sample | Description | |
| 1007-E | 20% Eudragit in IPA with 2% lactic acid | |
| 1007-F | 20% Eudragit in IPA with 2% lactic acid | |
| 1009-A | 25 mg Nisin and 25 mg Thymol in 1 mL 20% Eudragit in IPA with 2% lactic acid | |
| 1009-B | 25 mg Nisin and 25 mg Thymol in 1 mL 20% Eudragit in IPA with 2% lactic acid | |
| 1009-C | 25 mg Nisin and 25 mg Thymol in 1 mL 20% Eudragit in IPA with 2% lactic acid | |
| 1009-D | 25 mg Eugenol and 25 mg Thymol in 1 mL 20% Eudragit in IPA with 2% lactic acid | |
| 1009-E | 25 mg Eugenol and 25 mg Thymol in 1 mL 20% Eudragit in IPA with 2% lactic acid | |
| 1009-F | 25 mg Eugenol and 25 mg Thymol in 1 mL 20% Eudragit in IPA with 2% lactic acid | |
| 1015-A | 4% CHX in 20% Eudragit in IPA with 2% lactic acid | |
| 1015-B | 4% CHX in 20% Eudragit in IPA with 2% lactic acid | |
| 1015-C | 4% CHX in 20% Eudragit in IPA with 2% lactic acid | |
| 1016-A | 20% Eudragit in IPA with 2% lactic acid | |
| 1016-B | 20% Eudragit in IPA with 2% lactic acid | |
| 1016-C | 20% Eudragit in IPA with 2% lactic acid | |

Imaging the resulting films indicted good coverage across the sprayed surface with a cratered surface (prototype 1009-A and 1015-A), rippled surface (Prototype 1009-D), or smooth surface (Prototype 1007-B).

The sustained-release from single-component prototypes was tested (Table 14). Prototypes 1015-A-C were used for microbial testing and not for sustained-release assays.

TABLE 14

Sustained-release results from the indicated spray formulations

| | | | | | | | Thymol Release (ug) | | | | | | |
|---|---|---|---|---|---|---|---|---|---|---|---|---|---|
| Sample | 1 | 2 | 3 | 4 | 5 | 6 | 7 | 8 | 9 | 10 | 11 | 12 | 13 |
| 1007-A | 157 | 166 | 198 | 260 | 184 | 191 | 204 | 196 | 156 | 162 | 0 | 127 | 83 |
| Sample | 14 | 15 | 16 | 17 | 18 | 19 | 20 | 21 | 22 | 23 | 24 | 25 | 26 |
| 1007-A | 0 | 159 | 139 | 95 | 141 | 103 | 113 | 214 | 111 | 0 | 132 | 118 | 176 |
| Sample | 27 | | | | | | | | | | | | |
| 1007-A | 90 | | | | | | | | | | | | |

The bacterial inhibition from select samples was also tested.

TABLE 15

Bacterial inhibition testing results from indicated prototypes

| Prototype (antimicrobial) | Condition (strain, time of incubation) | Antibacterial area ratio (diameter inhibition zone/diameter test article) |
|---|---|---|
| 1007-A (thymol) | E. Coli, 20 hours | 0 (no inhibition relative to control) |
| 1009-A (Nisin/thymol) | E. Coli, 20 hours | 1.05 |
| 1009-D (Eugenol/Thymol) | E. Coli, 20 hours | 1.14 |
| 1015-A (CHX) | E. Coli, 20 hours | 1.67 |
| 1015-B (CHX) | Staph. Epidermidis, 20 hours | 1.83 |
| 1016-A (none) | Staph. Epidermidis, 20 hours | 1.15 |

18

Example 11: Proof of Principle Phone-Cover

As a practical developmental proof-of-principle, a series of films were prepared for use with cell-phone backing. Films were cut out of duralar to rectangles of 6×9 cm in size with rounded corners on the bottom edge. This size was selected to fit the back of a commercial cell phone (Samsun Galaxy S10) without obscuring the camera lens. The films were tared to obtain their initial mass and pressed flat between two glass plates to reduce their curling before addition of solution. Casting solutions made for these are as shown in Table 16.

TABLE 16

Casting solutions for scaled usability testing.

| Scale casting solution (prototype) | Description |
|---|---|
| 1023A-JSG | 0.295 g Thymol dissolved directly in 11.8 ml of 2% Chitosan/PVA/Lactic acid at 60° C. |
| 1023B-JSG (same solution divided between both) | 0.569 g Thymol, 0.569 ml of Eugenol, 11.38 ml of 20% Eudragit (70/30 IPA/2% lactic acid) stirred to dissolve at room temperature |
| 1026A-JSG | 0.259 g Thymol plus 1 ml of 20% Eudragit (70/30 IPA/2% lactic acid) slowly added 9.36 ml of 2% Chitosan/PVA/Lactic acid with rapid stirring |
| 1026B-JSG | 0.262 g Thymol plus 10.48 ml 20% Eudragit (70/30 IPA/2% lactic acid) |
| 1026C-JSG | 0.106 g Thymol, 0.106 ml Eugenol, 10.6 ml 2% Chitosan/PVA/Lactic acid stirred at room temperature |
| 1026D-JSG | 2 ml Chlorohexidine (20%, Aldrich) plus 8 ml 20% Eudragit (70/30 IPA/2% lactic acid) |
| 1028E-NDR | 0.103 g thymol, 1 ml Chlorohexidine (20%, Aldrich), 9 ml 20% Eudragit (70/30 IPA/2% lactic acid) |

The solutions were cast into 9×6 cm rectangles and dried to form films under covers to reduce evaporation speed at room temperature for 1-3 days. In cases where the films were still observed to be tacky were placed in an incubator at 60° C. for ~1-3 hours to finalize drying.

Observations. The curling of the films (due to being cut from a roll) often tended to cause the solutions to run off the edges. Prior to solution addition films were flattened between 2 pieces of glass with an weight (~3.6 kG) on top to compress them. This was done both at room temperature and also at 60° C. with cooling back to room temperature. Although, this seemed to reduce curling, the curling was still present and in many cases the solution would run off the edge. A subsequent test was performed where the piece was cut to fit a glass sheet and the backing was removed from the edges to be able to adhere it to the glass to force it to be flat.

Functionality Testing. The films were weighed before and after casting to obtain mass of coating on the piece (~50-60 cm$^2$ area covered). One series was cast to the edge (over-flowed) another series was cast only in the middle (under-filled) (Table 17).

TABLE 17

Gravimetric check of prepared test films

| Prototype | Note | Mass Film (g) | Equivalent Mass Active(s) (g) |
|---|---|---|---|
| 1023A-JSG | | 0.3145 | 0.198 g thymol |
| 1023B-JSG | N = 2, is AVG ± STDEV | 0.752 ± 0.04 | 0.188 ± 0.01 thymol, 0.188 ± 0.01 eugenol |

TABLE 17-continued

Gravimetric check of prepared test films

| Prototype | Note | Mass Film (g) | Equivalent Mass Active(s) (g) |
|---|---|---|---|
| 1026A-JSG | Overflowed | 0.191 | 0.086 g thymol |
| 1026B-JSG | Overflowed | 0.185 | 0.022 g thymol |
| 1026C-JSG | Overflowed | 0.140 | 0.035 g thymol, 0.035 g eugenol |
| 1026D-JSG | Overflowed | 0.089 | 0.022 g CHX |
| 1026A-JSG | Under filled | 0.201 | 0.090 g thymol |
| 1026B-JSG | Under filled | 0.230 | 0.028 g thymol |
| 1026C-JSG | Under filled | 0.134 | 0.034 g thymol, 0.034 g eugenol |
| 1026D-JSG | Under filled | 0.394 | 0.098 g CHX |

Usability

Sample 1023A-JSG was placed on the back of a cell phone and carried around in a pocket for 3 hours. After this time, an itchy sensation was felt on the thigh indicating excess thymol released (thymol can cause irritation at high concentrations). The sample 1026B-JSG-overflow was peeled and attached to the back of a cell phone and carried around in a pocket with normal usage for 8 days. After 8 days, the 1026B-JSG film was removed from the phone and a series of three circles were cut off from it and tested for release in triplicate. The table below shows the release as average±standard deviation (N=3) (Table 18).

TABLE 18

Thymol release from previously used 1026B-JSG film carried on the back of a cell phone for 8 days.

Thymol Release (ug) (Average ± Stdev, N = 3)

| Sample | 1 | 2 | 3 | 4 | 5 | 6 | 7 | 8 | 9 | 10 |
|---|---|---|---|---|---|---|---|---|---|---|
| 1026B-JSG (8 days in pocket) | 29 ± 25 | 82 ± 88 | 63 ± 82 | 39 ± 68 | 0 | 0 | 22 ± 38 | 20 ± 35 | 29 ± 50 | 0 |

| Sample | 11 | 12 | 13 | 14 | 15 | 16 | 17 | 18 | 19 | 20 |
|---|---|---|---|---|---|---|---|---|---|---|
| 1026B-JSG (8 days in pocket) | 0 | 79 ± 102 | 21 ± 36 | 0 | 16 ± 2 | 0 | 0 | 0 | 0 | 0 |

Example 12: Films with Essential Oils

Prototype solutions were prepared by combining solutions above with various biocidal actives (Table 19). These films were used for bacterial and release testing.

TABLE 19

Film prototype solution formulations

| Prototype ID | Active Ingredients | Polymer |
|---|---|---|
| 1111-A | 25 mg Thymol 25 uL Ginger Oil | 1 mL 20% Eud in 2% Lactic Acid/IPA |
| 1111-B | 25 mg Thymol 25 uL Clove Bud Oil | 1 mL 20% Eud in 2% Lactic Acid/IPA |
| 1111-C | 25 mg Thymol 25 uL Linalool | 1 mL 20% Eud in 2% Lactic Acid/IPA |
| 1111-D | 25 mg Thymol 25 uL Carvacrol | 1 mL 20% Eud in 2% Lactic Acid/IPA |
| 1111-E | 25 mg Thymol 25 uL Eugenol | 1 mL 20% Eud in 2% Lactic Acid/IPA |
| 1111-F | 25 mg Thymol 25 uL Cinnamaldehyde | 1 mL 20% Eud in 2% Lactic Acid/IPA |

These were evaluated for effect against bacteria (Table 20).

TABLE 20

Bacterial inhibition testing results from indicated prototypes

| Prototype (description) | Condition (strain, time of incubation) | Antibacterial area ratio (diameter inhibition zone/diameter test article) |
|---|---|---|
| 1111-A (Thymol 25 mg/ml/Ginger oil 25 ml/ml in Eudragit) | *E. Coli*, 20 hours | 1.30 |
| 1111-B (Thymol 25 mg/ml/Clove bud oil 25 ml/ml) | *E. Coli*, 20 hours | 1.43 |
| 1111-C (Thymol 25 mg/ml/Linalool 25 ml/ml in Eudragit) | *E. Coli*, 20 hours | 1.05 |
| 1111-D (Thymol 25 mg/ml/Carvacrol 25 ml/ml in Eudragit) | *E. Coli*, 20 hours | 1.15 |
| 1111-E (Thymol 25 mg/ml/Eugenol 25 ml/ml in Eudragit) | *E. Coli*, 20 hours | 1.17 |
| 1111-F (Thymol 25 mg/ml/ Cinnamaldehyde 25 ml/ml in Eudragit) | *E. Coli*, 20 hours | 1.33 |

Example 13. Block Copolymer Testing

The block copolymers were found to be insoluble in acetone and ethanol and so were dissolved in toluene which did dissolve them well. These were prepared and cast onto duralar as previously described using the polymer solutions in Table 21.

TABLE 21

Block copolymer prototype solution formulations.

| Prototype ID | Active Ingredients | Polymer | Notes |
|---|---|---|---|
| 1123-A 1123-B | None (blank) | 20% PSB-polyethylene-ran-butylene in toluene (PSEBS) | Films dried clear and flexible, but bubbly/bumpy |
| 1123-C 1123-D | None (blank) | 20% PSB-polyisoprene in toluene (PSIS) | Films dried clear and flexible; smooth. |
| 1123-E 1123-F | None (blank) | 20% PSB-polybutadiene in toluene (PSBS) | Films dried clear and flexible; smooth. |
| 1207-A 1207-B | 25 mg/mL Thymol | 20% PSB-polyethylene-ran-butylene in toluene (PSEBS) | Polymer solution was too viscous to measure via pipette. Dried clear and |

TABLE 21-continued

| Block copolymer prototype solution formulations. | | | |
|---|---|---|---|
| Prototype ID | Active Ingredients | Polymer | Notes |
| 1207-C | 25 mg/mL | 20% PSB-polyisoprene | flexible, but lumpy. |
| 1207-D | Thymol | in toluene (PSIS) | Films dried clear and flexible; smooth. |
| 1207-E | 25 mg/mL | 20% PSB-polybutadiene | Films dried clear and |
| 1207-F | Thymol | in toluene (PSBS) | flexible; smooth. |

These samples were assayed for their sustained-release properties by UV-Vis as previously described. Unlike other release testing which proceeded at a regular interval along every business day (Mon-Fri, not tested on Sat/Sun). This test stretched across an extended holiday break. As such the date of the sampling draw is included in addition to the number of the draws (Table 22).

TABLE 22

| Thymol release from indicated block copolymer formulation. | | | | | | | | | |
|---|---|---|---|---|---|---|---|---|---|
| Thymol Release (ug) | | | | | | | | | |
| Sample | 1 | 2 | 3 | 4 | 5 | 6 | 7 | 8 | 9 | 10 |
| Date | 12/8 | 12/9 | 12/10 | 12/11 | 12/14 | 12/15 | 12/16 | 12/17 | 12/18 | 12/21 |
| 1207-B | 225.48 | 239.98 | 276.47 | 292.37 | 131.92 | 79.53 | 61.75 | 49.12 | 63.62 | 2.34 |
| 1207-D | 932.79 | 693.28 | 663.34 | 575.86 | 153.44 | 94.96 | 81.86 | 82.33 | 145.02 | 46.31 |
| 1207-F | 809.76 | 702.64 | 776.08 | 852.80 | 220.80 | 173.09 | 139.40 | 127.66 | 52.86 | 66.90 |
| Sample | 11 | 12 | 13 | 14 | 15 | 16 | 17 | 18 | 19 | 20 |
| Date | 12/22 | 1/4 | 1/5 | 1/6 | 1/7 | 1/8 | 1/11 | 1/12 | 1/13 | 1/14 |
| 1207-B | 11.23 | 1.40 | 0 | 0 | 10.29 | 0 | 0 | 0 | 0 | 0 |
| 1207-D | 45.84 | 21.05 | 20.58 | 17.78 | 19.18 | 0 | 0 | 0 | 8.89 | 11.69 |
| 1207-F | 75.78 | 34.62 | 29.47 | 7.02 | 0.47 | 14.50 | 0 | 0 | 17.78 | 15.44 |

Bacterial In-Vitro Trials

Duralar coated prototypes listed here were tested for bacterial inhibition as previously described. This was done by coating surface of agar with bacterial broth and then applying prototype to surface of agar. All tests used diluted (1:7500) nutrient broth from active bacterial cultures. Unlike tests done previously which were performed on fresh samples these samples were roughly 1 month old prior to bacteria challenge testing indicating the results after 1 month of aging exposed to normal air under room temperature (Table 23).

TABLE 23

| Bacterial inhibition testing results from indicated prototypes | | |
|---|---|---|
| Prototype (description) | Condition (strain, time of incubation) | Antibacterial area ratio (diameter inhibition zone/diameter test article) |
| 1207A (25 mg/mL Thymol in PSEBS, 1 month old) | E. Coli, 20 hours | 1.07 |
| 1207-C (Thymol 25 mg/ml in PSIS, 1 month old) | E. Coli, 20 hours | 0 (no inhibition relative to control) |
| 1207-E (Thymol 25 mg/ml in PSBS, 1 month old) | E. Coli, 20 hours | 1.05 |

Example 14. Citral and Cinnamaldehyde Testing

Further testing was performed on films containing the key ingredients citral and cinnamaldehyde. These were prepared both alone and in combination as described in Table 24.

TABLE 24

| Prototype testing formulations | | | |
|---|---|---|---|
| Prototype ID | Active Ingredients | Polymer | Notes |
| 1207-G, 1207-H | 25 mg/mL Cinnamaldehyde | 20% Eudragit in 2% Lactic acid/IPA | Films dried clear and flexible; smooth. |
| 1210-A, 1210-B | 25 mg/mL Thymol 25 mg/mL Citral | 20% Eudragit in 2% Lactic acid/IPA | Films dried clear and flexible; smooth. |
| 1210-C, | 25 mg/mL Thymol | 20% Eudragit | Films dried |

TABLE 24-continued

| Prototype testing formulations | | | |
|---|---|---|---|
| Prototype ID | Active Ingredients | Polymer | Notes |
| 1210-D | 10 mg/mL Citral 10 mg/mL Cinnamaldehyde | in 2% Lactic acid/IPA | clear and flexible; smooth. |
| 1210-E, 1210-F | 25 mg/mL Citral | 20% Eudragit in 2% Lactic acid/IPA | Films dried clear and flexible; smooth. |

These were tested for sustained-release as follows (Table 25). The single-component film sustained-release behavior is shown below. This represents the sustained-release of cinnamaldehyde and citral from Eudragit films. For prototypes 1210-F and 1207-H, the eluted active was of such a high concentration that the UV-Vis analysis was initially too saturated for absorption. To compensate for this the samples were diluted in PBST in a range 1:2 to 1:17 parts sample: PBST to adjust the sample into a measurable range for the instrument. The quantified μg quantities of eluted material have taken this dilution effect into consideration during their calculations.

TABLE 25

| | | | | | Antimicrobial Release (ug) | | | | | |
|---|---|---|---|---|---|---|---|---|---|---|
| Sample | 1 | 2 | 3 | 4 | 5 | 6 | 7 | 8 | 9 | 10 |
| Date | 12/8 | 12/9 | 12/10 | 12/11 | 12/14 | 12/15 | 12/16 | 12/17 | 12/18 | 12/21 |
| 1207-H (Cinnamaldehyde) | 649.03 | 446.07 | 420.88 | 587.63 | 94.17 | 146.46 | 203.51 | 182.31 | 226.42 | 187.49 |
| Sample | 1 | 2 | 3 | 4 | 5 | 6 | 7 | 8 | 9 | 10 |
| Date | 12/11 | 12/14 | 12/15 | 12/16 | 12/17 | 12/18 | 12/21 | 12/22 | 1/4 | 1/5 |
| 1210-F (Citral) | 128.31 | 207.63 | 113.96 | 138.41 | 128.31 | 154.38 | 61.62 | 50.57 | 37.08 | 50.47 |
| Sample | 11 | 12 | 13 | 14 | 15 | 16 | 17 | 18 | 19 | 20 |
| Date | 12/22 | 1/4 | 1/5 | 1/6 | 1/7 | 1/8 | 1/11 | 1/12 | 1/13 | 1/14 |
| 1207-H (Cinnamaldehyde) | 109.79 | 86.14 | 72.77 | 70.24 | 155.55 | 46.55 | 18.93 | 16.94 | 11.91 | 7.49 |
| Sample | 11 | 12 | 13 | 14 | 15 | 16 | 17 | 18 | 19 | 20 |
| Date | 1/6 | 1/7 | 1/8 | 1/11 | 1/12 | 1/13 | 1/14 | 1/15 | 1/19 | 1/20 |
| 1210-F (Citral) | 34.45 | 38.51 | 25.21 | 25.26 | 24.16 | 17.18 | 15.64 | 14.97 | 45.98 | 11.43 |

Bacterial In-Vitro Trials

Bacterial inhibition testing was done by coating surface of agar with bacterial broth and then applying prototype to surface of agar. All tests used diluted (1:7500) nutrient broth from active bacterial cultures. Unlike tests done previously which were performed on fresh samples these samples were roughly 1 month old prior to bacteria challenge testing indicating the results after 1 month of aging openly exposed under room temperature (Table 26).

TABLE 26

Bacterial inhibition testing results from indicated prototypes

| Prototype (description) | Condition (strain, time of incubation) | Antibacterial area ratio (diameter inhibition zone/diameter test article) |
|---|---|---|
| 1207-G (25 mg/mL Cinnamaldehyde in Eudrigit), | *E. Coli*, 20 hours | 1.29 |
| 1210-A (25 mg/mL Thymol 25 mg/mL Citral in Eudragit) | *E. Coli*, 20 hours | 0 (no inhibition relative to control) |
| 1210-C (25 mg/mL Cinnamaldehyde, | *E. Coli*, 20 hours | 1.16 |

TABLE 26-continued

Bacterial inhibition testing results from indicated prototypes

| Prototype (description) | Condition (strain, time of incubation) | Antibacterial area ratio (diameter inhibition zone/diameter test article) |
|---|---|---|
| 25 mg/mL Thymol 25 mg/mL Citral in Eudragit) 1210-E (25 mg/mL Citral in Eudragit) | *E. Coli*, 20 hours | 0 (no inhibition relative to control) |

Example 15

A piece of Duralar film was coated with a casting solution consisting of 10 mg/ml thymol, 20 mg/ml chlorohexidine, in 20% w/v Eudragit. The sustained-release of thymol and chlorohexidine from the sample after being on the back of a cellphone in common use for 1 month was measured. Although the individual contribution of each drug to the UV-Vis absorbance is not easily ascertained, the spectral absorbance does indicate the sustained-release of the anti-microbial agents in general. The absorbance at 274 nm (peak for thymol) is displayed in Table 27 below.

TABLE 27

UV-Vis absorbance from wash-solution from pieces cut off
sample 1208 after common use for 1 month.

| | | | | | UV-Vis absorbance (274 nm) (Average ± STDEV, N = 3) | | | | | |
|---|---|---|---|---|---|---|---|---|---|---|
| Sample | 1 | 2 | 3 | 4 | 5 | 6 | 7 | 8 | 9 | 10 |
| Date | 12/8 | 12/9 | 12/10 | 12/11 | 12/14 | 12/15 | 12/16 | 12/17 | 12/18 | 12/21 |
| 1208 (CHX + Thymol) UV-Vis | 0.05 ± 0.10 | 1.23 ± 0.88 | 1.96 ± 1.33 | 1.72 ± 1.18 | 2.11 ± 1.41 | 1.03 ± 0.63 | 1.15 ± 0.91 | 1.08 ± 0.76 | 1.07 ± 0.80 | 1.50 ± 1.29 |
| Sample | 11 | 12 | 13 | 14 | 15 | 16 | 17 | 18 | 19 | 20 |
| Date | 12/22 | 1/4 | 1/5 | 1/11 | 1/12 | 1/13 | 1/14 | 1/15 | 1/19 | 1/20 |
| 1208 (CHX + Thymol) | 0.84 ± 0.64 | 0.28 ± 0.39 | 0.36 ± 0.26 | 0.33 ± 0.25 | 0.63 ± 0.59 | 0.33 ± 0.17 | 0.15 ± 0.11 (N = 2) | 0.13 ± 0.08 | 0.10 ± 0.09 | 0.09 ± 0.07 |

Example 16. Usability Cinnamaldehyde-Thymol

A film (1208JSG-A) was made by dissolving 0.254 grams of Thymol and 100 μl of cinnamaldehyde into 10 ml of 20% Eudragit (70:30 IPA:2% lactic acid). This solution was cast onto a Duralar piece (~12×12 cm, total mass of film is 1.907 grams on top of 4.322 g of Duralar). A section was cut off and attached to the back of a cell phone for 7 days. This section was removed and used for release and antibacterial testing. In particular, The sample (25 mg/ml thymol, 10 mg/ml Cinnamaldehyde in Eudragit) was then tested against E. Coli for 20 hours of incubation. The resulting Antibacterial area ratio (diameter inhibition zone/diameter test article) was 1.10.

Example 17. Thymol Release and Artificial Skin Comparison

Film Coating

Prototype solutions were prepared by combining polymer solutions above with various biocidal actives. These films were used for bacterial and release testing.

TABLE 28

| Film prototype solution formulations for rinse testing | | |
| --- | --- | --- |
| Prototype ID | Active Ingredient | Polymer |
| 226-A | Thymol 50 mg/mL | 20% Eudragit in IPA |
| 226-B | | with 2% Lactic Acid |
| 226-C | | |
| 226-D | Thymol 40 mg/mL | 20% Eudragit in IPA |
| 226-E | | with 2% Lactic Acid |
| 226-F | | |
| 226-G | Thymol 25 mg/mL | 20% Eudragit in IPA |
| 226-H | | with 2% Lactic Acid |
| 226-I | | |

TABLE 29

| Artificial skin touch-test prototype formulations | | |
| --- | --- | --- |
| Prototype ID | Active Ingredient | Polymer |
| 303-AVS1 | Thymol 50 mg/mL | 20% Eudragit in IPA |
| 303-AVS2 | | with 2% Lactic Acid |
| 303-AVS3 | | |
| 303-BVS1 | Thymol 40 mg/mL | 20% Eudragit in IPA |
| 303-BVS2 | | with 2% Lactic Acid |
| 303-BVS3 | | |
| 303-CVS1 | Thymol 25 mg/mL | 20% Eudragit in IPA |
| 303-CVS2 | | with 2% Lactic Acid |
| 303-CVS3 | | |

Calibration Thymol in Ethanol

The optimal wavelength for UV-Vis absorbance was determined for thymol in ethanol by creating a representative standard solution and obtaining an absorbance spectrum from 190-900 nm using the UV-Vis spectrophotometer. The strongest absorbance peak at the highest wavelength was selected from this scan. A series of standard solutions was created by serially diluting thymol in EtOH. The solutions were scanned by UV-Vis at the previously determined wavelength of 274 nm. this information was used to create a calibration curve using MS Excel and curve was determined to be ABS (274 nm)=0.0106*(Thymol ug/ml) ($R^2$=0.9998)

Release Assay-Artificial Skin

In addition to the previously disclosed sustained-release assay, an artificial skin touch-testing was conducted every business day. Artificial skin was cut into ¾" disks. Four drops of PBST were applied to thymol film samples (303AVS, BVS, and CVS), as well as one Eudragit disk with no thymol (control sample). With gloved hands, the artificial skin disks were placed on the index finger with rough side facing out. The skin sample disk was then applied to the wetted thymol film samples using mild pressure and moving in small circles for five seconds (FIG. 2A). A pair of tweezers was used to transfer the skin sample into the bottom of a 20 mL scintillation vial. 3 mL EtOH was pipetted into the vials; the vials were placed onto an orbital shaker at 140 RPM for 5 minutes. Tweezers were used to remove and discard the skin disks from each vial.

The rate of release was measured by collecting the UV-Vis absorbance spectrum (190 nm-900 nm) for each ethanol soak. The spectra for each prototype were stacked upon one another in order to observe how the release of thymol varied from day to day. The quantity of release was calculated by subtracting the UV-Vis absorbance of the control article from the drug-loaded article to remove background. The UV-Vis absorbance was subsequently converted to ug/mL concentration based on the developed calibration curve for that compound. This was multiplied by 3 (3 mL total volume) to obtain the release quantity of active ingredient at that time point.

TABLE 30

| Average Thymol released for rinse-tested prototypes | | | | |
| --- | --- | --- | --- | --- |
| Pull # | Date | 226-A, B, C 50 mg/mL | 226-D, E, F 40 mg/mL | 226-G, H, I 25 mg/mL |
| 1 | 3/1 | 373 ± 49 ug | 452 ± 125 ug | 168 ± 35 ug |
| 2 | 3/2 | 515 ± 64 ug | 513 ± 157 ug | 248 ± 28 ug |
| 3 | 3/3 | 489 ± 59 ug | 470 ± 145 ug | 244 ± 21 ug |
| 4 | 3/4 | 276 ± 37 ug | 311 ± 132 ug | 102 ± 17 ug |
| 5 | 3/5 | 279 ± 35 ug | 302 ± 132 ug | 58 ± 22 ug |
| 6 | 3/8 | 249 ± 32 ug | 310 ± 129 ug | 95 ± 9 ug |
| 7 | 3/9 | 250 ± 34 ug | 311 ± 99 ug | 91 ± 19 ug |
| 8 | 3/10 | 332 ± 35 ug | 383 ± 102 ug | 132 ± 26 ug |
| 9 | 3/11 | 330 ± 39 ug | 367 ± 101 ug | 139 ± 23 ug |
| 10 | 3/12 | 143 ± 58 ug | 135 ± 69 ug | 0 ug |
| 11 | 3/15 | 126 ± 40 ug | 180 ± 80 ug | 47 ± 82 ug |
| 12 | 3/16 | 173 ± 28 ug | 223 ± 72 ug | 47 ± 15 ug |
| 13 | 3/17 | 378 ± 33 ug | 384 ± 63 ug | 171 ± 20 ug |
| 14 | 3/18 | 91 ± 30 ug | 110 ± 66 ug | 0 ug |
| 15 | 3/19 | 291 ± 27 ug | 306 ± 59 ug | 155 ± 21 ug |
| 16 | 3/22 | 187 ± 25 ug | 224 ± 63 ug | 56 ± 21 ug |
| 17 | 3/23 | 275 ± 18 ug | 267 ± 51 ug | 102 ± 22 ug |
| 18 | 3/24 | 134 ± 25 ug | 157 ± 53 ug | 23 ± 23 ug |
| 19 | 3/25 | 202 ± 37 ug | 199 ± 47 ug | 69 ± 20 ug |
| 20 | 3/28 | 195 ± 31 ug | 200 ± 42 ug | 61 ± 19 ug |

TABLE 31

| Average Thymol released for touch-tested prototypes | | | | |
| --- | --- | --- | --- | --- |
| Pull # | Date | 303-AVS 50 mg/mL | 303-BVS 40 mg/mL | 303-CVS 25 mg/mL |
| 1 | 3/3 | 42 ± 16 ug | 34 ± 8 ug | 46 ± 8 ug |
| 2 | 3/4 | 6 ± 1 ug | 11 ± 11 ug | 16 ± 4 ug |
| 3 | 3/5 | 2 ± 3 ug | 12 ± 6 ug | 18 ± 7 ug |
| 4 | 3/8 | 17 ± 20 ug | 15 ± 18 ug | 3 ± 5 ug |
| 5 | 3/9 | 12 ± 10 ug | 32 ± 41 ug | 18 ± 8 ug |
| 6 | 3/10 | 0 ug | 0 ug | 0 ug |
| 7 | 3/11 | 2 ± 3 ug | 2 ± 4 ug | 0 ug |
| 8 | 3/12 | 0 ug | 0 ug | 0 ug |
| 9 | 3/15 | 0 ug | 2 ± 4 ug | 0 ug |
| 10 | 3/16 | 0 ug | 20 ± 35 ug | 0 ug |
| 11 | 3/17 | 0 ug | 0 ug | * |
| 12 | 3/18 | * | * | * |

TABLE 31-continued

| | | Average Thymol released for touch-tested prototypes | | |
|---|---|---|---|---|
| Pull # | Date | 303-AVS 50 mg/mL | 303-BVS 40 mg/mL | 303-CVS 25 mg/mL |
| 13 | 3/19 | * | * | * |
| 14 | 3/22 | 0 ug | 15 ± 14 ug | 0 ug |
| 15 | 3/23 | 8 ± 8 ug | 0 ug | 12 ± 19 ug |
| 16 | 3/24 | 3 ± 4 ug | 4 ± 7 ug | 8 ± 14 ug |
| 17 | 3/25 | 17 ± 18 ug | 17 ± 10 ug | 23 ± 8 ug |
| 18 | 3/28 | 9 ± 15 ug | 2 ± 2 ug | 10 ± 10 ug |
| 19 | 3/29 | 8 ± 14 ug | 6 ± 5 ug | 14 ± 13 ug |
| 20 | 3/30 | 8 ± 14 ug | 2 ± 4 ug | 14 ± 13 ug |

*Samples marked with an asterisk were lost; data for these pulls are unavailable.

Example 18. Single Component Polymer Tests of Polystyrene and Polyisobutylene Film Coating Prototype solutions were prepared by combining polymer solutions above with Thymol. These films were used for release testing.

TABLE 32

| | | Film prototype solution formulations for rinse testing | |
|---|---|---|---|
| Prototype ID | Active Ingredient | Polymer | Notes |
| PSB | None (control) | 20% Polystyrene in Toluene | |
| PIBB | None (control) | 15% Polyisobutylene in Toluene | |
| 407-A | Thymol | 20% Polystyrene in Toluene | Solutions spread evenly |
| 407-B | 25 mg/mL | | across the film disks. |
| 407-C | | | Dried smoothly. Disks |
| 407-D | Thymol | | came away from well |
| 407-E | 40 mg/mL | | plate during first and |
| 407-F | | | subsequent rinses. |
| 407-G | Thymol | | |

TABLE 32-continued

| | | Film prototype solution formulations for rinse testing | |
|---|---|---|---|
| Prototype ID | Active Ingredient | Polymer | Notes |
| 407-H | 50 mg/mL | | |
| 407-I | | | |
| 407-J | Thymol | 15% Polyisobutylene | Solutions were viscous |
| 407-K | 25 mg/mL | in Toluene | and difficult to spread |
| 407-L | | | across the film disks. |
| 407-M | Thymol | | Dried bumpy and with |
| 407-N | 40 mg/mL | | air bubbles. Disks came |
| 407-O | | | away from well plate |
| 407-P | Thymol | | during first and |
| 407-Q | 50 mg/mL | | subsequent rinses. |
| 407-R | | | |

Sustained-Release Assay

Sustained-release testing was conducted every business day. 3 mL of PBST was pipetted into each well. The well-plates were covered and placed on a room-temperature orbital shaker at 140 RPM for 5 minutes. With care being taken not to directly contact the film itself, a disposable pipette was used to transfer the PBST solution from each well into its own scintillation vial. A fresh pipette was used for each well and then discarded immediately. The well plates were covered and stored at room temperature in between rinse tests.

The rate of active agent release was measured by collecting the UV-Vis absorbance at 274 nm for each sample pull (consecutive business days). The quantity of release was calculated by subtracting the UV-Vis absorbance of the control article (Control piece which contains all the same components as the test article except the drug) from the drug-loaded article to remove background. The UV-Vis absorbance was subsequently converted to ug/mL concentration based on the developed calibration curve for that compound. This was multiplied by 3 (3 mL, total volume) to obtain the release quantity of active ingredient at that time point (Table 1).

TABLE 33

| | | | | | Thymol released (ug) for each sample | | | | | | | | | | | |
|---|---|---|---|---|---|---|---|---|---|---|---|---|---|---|---|---|
| Pull # | 1 | 2 | 3 | 4 | 5 | 6 | 7 | 8 | 9 | 10 | 11 | 12 | 13 | 14 | 15 | 16 |
| 407-A | 5 | 21 | 7 | 0 | 18 | 0 | 8 | 0 | 1 | 8 | 12 | 9 | 2 | 6 | 12 | 10 |
| 407-B | 1 | 22 | 12 | 19 | 9 | 0 | 0 | 0 | 1 | 4 | 3 | 0 | 3 | 0 | 9 | 4 |
| 407-C | 10 | 23 | 14 | 15 | 10 | 0 | 0 | 0 | 14 | 12 | 9 | 12 | 2 | 0 | 11 | 9 |
| 407-D | 10 | 60 | 44 | 30 | 36 | 7 | 7 | 22 | 22 | 20 | 15 | 36 | 9 | 27 | 41 | 36 |
| 407-E | 9 | 34 | 28 | 20 | 17 | 0 | 6 | 0 | 19 | 22 | 23 | 16 | 7 | 5 | 19 | 21 |
| 407-F | 10 | 62 | 34 | 12 | 7 | 0 | 0 | 15 | 8 | 10 | 3 | 5 | 15 | 0 | 6 | 5 |
| 407-G | 4 | 41 | 80 | 42 | 31 | 6 | 22 | 6 | 9 | 41 | 44 | 38 | 54 | 29 | 39 | 35 |
| 407-H | 15 | 60 | 101 | 47 | 36 | 7 | 23 | 13 | 22 | 42 | 40 | 36 | 16 | 30 | 40 | 35 |
| 407-I | 13 | 221 | 58 | 43 | 194 | 12 | 25 | 130 | 136 | 48 | 97 | 41 | 12 | 51 | 37 | 50 |
| 407-J | 20 | 65 | 81 | 41 | 27 | 21 | 15 | 4 | 0 | 0 | 0 | 0 | 0 | 0 | 0 | 0 |
| 407-K | 26 | 124 | 201 | 124 | 89 | 85 | 68 | 85 | 59 | 44 | 41 | 34 | 52 | 20 | 18 | 21 |
| 407-L | 30 | 171 | 335 | 224 | 176 | 150 | 124 | 142 | 113 | 80 | 93 | 74 | 91 | 43 | 35 | 40 |
| 407-M | 43 | 188 | 392 | 219 | 176 | 160 | 123 | 126 | 118 | 75 | 79 | 63 | 80 | 39 | 32 | 38 |
| 407-N | 45 | 262 | 295 | 184 | 163 | 137 | 96 | 86 | 79 | 0 | 69 | 0 | 1 | 39 | 0 | 0 |
| 407-O | 38 | 254 | 515 | 342 | 245 | 245 | 192 | 209 | 173 | 138 | 146 | 110 | 134 | 73 | 63 | 65 |
| 407-P | 49 | 209 | 522 | 347 | 270 | 234 | 184 | 70 | 171 | 129 | 139 | 124 | 112 | 77 | 68 | 73 |
| 407-Q | 55 | 269 | 164 | 74 | 61 | 71 | 17 | 36 | 7 | 0 | 0 | 0 | 15 | 0 | 0 | 0 |
| 407-R | 45 | 262 | 172 | 268 | 152 | 137 | 99 | 17 | 0 | 0 | 0 | 0 | 1 | 0 | 0 | 0 |

TABLE 34

| | | | | | | | |
|---|---|---|---|---|---|---|---|
| | | Pull dates and average Thymol released for rinse-tested prototypes | | | | | |
| Pull # | Pull date | 407-A, B, C | 407-D, E, F | 407-G, H, I | 407-J, K, L | 407-M, N, O | 407-P, Q, R |
| 1 | 4/8 | 5 ± 4 µg | 10 µg | 8 ± 6 µg | 11 ± 5 µg | 20 ± 4 µg | 33 ± 5 µg |
| 2 | 4/9 | 22 ± 1 µg | 52 ± 16 µg | 107 ± 99 µg | 120 ± 53 µg | 235 ± 41 µg | 247 ± 33 µg |
| 3 | 4/12 | 11 ± 4 µg | 28 ± 8 µg | 47 ± 22 µg | 80 ± 127 µg | 113 ± 110 µg | 309 ± 204 µg |
| 4 | 4/13 | 11 ± 10 µg | 22 ± 9 µg | 25 ± 3 µg | 44 ± 92 µg | 69 ± 83 µg | 189 ± 140 µg |
| 5 | 4/14 | 12 ± 5 µg | 21 ± 15 µg | 18 ± 93 µg | 87 ± 74 µg | 104 ± 44 µg | 147 ± 105 µg |
| 6 | 4/15 | 0 µg | 2 ± 4 µg | 2 ± 3 µg | 9 ± 65 µg | 39 ± 57 µg | 132 ± 82 µg |
| 7 | 4/16 | 3 ± 4 µg | 5 ± 4 µg | 9 ± 2 µg | 23 ± 54 µg | 36 ± 49 µg | 105 ± 83 µg |
| 8 | 4/19 | 0 µg | 7 ± 11 µg | 7 ± 69 µg | 50 ± 69 µg | 73 ± 63 µg | 117 ± 27 µg |
| 9 | 4/20 | 5 ± 7 µg | 18 ± 8 µg | 12 ± 70 µg | 56 ± 57 µg | 65 ± 47 µg | 97 ± 97 µg |
| 10 | 4/21 | 8 ± 4 µg | 18 ± 6 µg | 25 ± 4 µg | 44 ± 40 µg | 31 ± 69 µg | 67 ± 74 µg |
| 11 | 4/22 | 8 ± 4 µg | 16 ± 10 µg | 23 ± 32 µg | 61 ± 46 µg | 46 ± 42 µg | 71 ± 80 µg |
| 12 | 4/23 | 7 ± 6 µg | 21 ± 16 µg | 20 ± 2 µg | 38 ± 37 µg | 25 ± 55 µg | 57 ± 71 µg |
| 13 | 4/26 | 2 µg | 6 ± 4 µg | 25 ± 23 µg | 27 ± 46 µg | 21 ± 67 µg | 74 ± 61 µg |
| 14 | 4/27 | 2 ± 3 µg | 11 ± 14 µg | 11 ± 12 µg | 37 ± 21 µg | 23 ± 20 µg | 34 ± 44 µg |
| 15 | 4/28 | 10 ± 2 µg | 24 ± 17 µg | 21 ± 2 µg | 39 ± 18 µg | 18 ± 31 µg | 28 ± 39 µg |
| 16 | 4/29 | 8 ± 3 µg | 22 ± 15 µg | 20 ± 9 µg | 40 ± 20 µg | 24 ± 37 µg | 33 ± 42 µg |

Example 19. Single Component Polymer Tests of Polyisoprene

Film Coating

Prototype solutions were prepared by combining polymer solutions above with Thymol. These films were used for release testing.

TABLE 35

| | | | |
|---|---|---|---|
| | Film prototype solution formulations for rinse testing | | |
| Prototype ID | Active Ingredient | Polymer | Notes |
| PIPB | None (control) | 20% Polyisoprene in Toluene | |
| 504-A | Thymol | 20% Polyisoprene | Raw polymer was a dark |
| 504-B | 25 mg/mL | in Toluene | brown, opaque viscous liquid |
| 504-C | | | with the color and consistency |
| 504-D | Thymol | | of chocolate syrup. The |
| 504-E | 40 mg/mL | | polymer/toluene solution was |
| 504-F | | | thin and runny. The films |
| 504-G | Thymol | | never hardened after the |
| 504-H | 50 mg/mL | | toluene had evaporated off |
| 504-I | | | The films were semi-translucent brown in color. |

Sustained-Release Assay

Sustained-release testing was conducted every business day. 3 mL of PBST was pipetted into each well. The well-plates were covered and placed on a room-temperature orbital shaker at 140 RPM for 5 minutes. With care being taken not to directly contact the film itself, a disposable pipette was used to transfer the PBST solution from each well into its own scintillation vial. A fresh pipette was used for each well and then discarded immediately. The well plates were covered and stored at room temperature in between rinse tests.

The rate of release was measured by collecting the UV-Vis absorbance at 274 nm for each sample pull.

The quantity of active agent release was calculated by subtracting the UV-Vis absorbance of the control article (Control piece which contains all the same components as the test article except the drug) from the drug-loaded article to remove background. The UV-Vis absorbance was subsequently converted to ug/mL concentration based on the developed calibration curve for that compound. This was multiplied by 3 (3 mL total volume) to obtain the release quantity of active ingredient at that time point (Table 36),

TABLE 36

| | | | | | | | | | |
|---|---|---|---|---|---|---|---|---|---|
| | Thymol released (ug) for each sample | | | | | | | | |
| | 504-A | 504-B | 504-C | 504-D | 504-E | 504-F | 504-G | 504-H | 504-I |
| 1 | 39 | 43 | 22 | 27 | 27 | 0 | 26 | 22 | 26 |
| 2 | 49 | 50 | 20 | 20 | 22 | 72 | 31 | 21 | 21 |
| 3 | 40 | 45 | 15 | 19 | 17 | 64 | 14 | 12 | 17 |
| 4 | 46 | 53 | 11 | 17 | 15 | 86 | 21 | 12 | 15 |
| 5 | 42 | 45 | 9 | 19 | 14 | 74 | 14 | 10 | 13 |
| 6 | 28 | 34 | 7 | 10 | 10 | 54 | 11 | 7 | 11 |
| 7 | 35 | 39 | 9 | 17 | 13 | 39 | 36 | 5 | 12 |
| 8 | 18 | 23 | 4 | 5 | 6 | 42 | 12 | 7 | 8 |
| 9 | 19 | 22 | 3 | 6 | 8 | 44 | 11 | 1 | 8 |
| 10 | 13 | 14 | 1 | 0 | 5 | 28 | 8 | 7 | 5 |
| 11 | 10 | 11 | 6 | 24 | 8 | 35 | 10 | 5 | 8 |
| 12 | 7 | 6 | 0 | 0 | 0 | 21 | 6 | 0 | 3 |
| 13 | 1 | 19 | 3 | 0 | 0 | 29 | 0 | 0 | 0 |
| 14 | 7 | 7 | 3 | 0 | 2 | 23 | 5 | 0 | 0 |
| 15 | 8 | 9 | 2 | 0 | 2 | 16 | 4 | 0 | 2 |
| 16 | 9 | 11 | 4 | 1 | 3 | 19 | 4 | 1 | 3 |
| 17 | 6 | 7 | 2 | 0 | 4 | 17 | 4 | 10 | 11 |
| 18 | 7 | 11 | 16 | 3 | 4 | 23 | 32 | 3 | 4 |

TABLE 36-continued

| | Thymol released (ug) for each sample | | | | | | | | |
|---|---|---|---|---|---|---|---|---|---|
| | 504-A | 504-B | 504-C | 504-D | 504-E | 504-F | 504-G | 504-H | 504-I |
| 19 | 3 | 4 | 2 | 0 | 0 | 14 | 7 | 0 | 0 |
| 20 | 6 | 3 | 0 | 0 | 0 | 18 | 2 | 0 | 0 |

TABLE 37

| | Pull dates and average Thymol released for rinse-tested prototypes | | | |
|---|---|---|---|---|
| | Pull Date | 504-A, B, C | 504-D, E, F | 504-G, H, I |
| 1 | 5/6 | 35 ± 11 µg | 18 ± 16 µg | 25 ± 2 µg |
| 2 | 5/7 | 40 ± 17 µg | 38 ± 29 µg | 24 ± 6 µg |
| 3 | 5/10 | 33 ± 16 µg | 33 ± 27 µg | 14 ± 3 µg |
| 4 | 5/11 | 37 ± 22 µg | 39 ± 40 µg | 16 ± 5 µg |
| 5 | 5/12 | 32 ± 20 µg | 36 ± 33 µg | 12 ± 2 µg |
| 6 | 5/13 | 23 ± 14 µg | 25 ± 25 µg | 9 ± 2 µg |
| 7 | 5/14 | 27 ± 16 µg | 23 ± 14 µg | 18 ± 16 µg |
| 8 | 5/17 | 15 ± 10 µg | 18 ± 21 µg | 9 ± 2 µg |
| 9 | 5/18 | 15 ± 10 µg | 19 ± 22 µg | 6 ± 5 µg |
| 10 | 5/19 | 9 ± 7 µg | 11 ± 15 µg | 7 ± 2 µg |
| 11 | 5/20 | 9 ± 3 µg | 22 ± 13 µg | 8 ± 3 µg |
| 12 | 5/21 | 4 ± 4 µg | 7 ± 12 µg | 3 ± 3 µg |
| 13 | 5/24 | 8 ± 9 µg | 10 ± 17 µg | 0 ± 0 µg |
| 14 | 5/25 | 6 ± 2 µg | 8 ± 13 µg | 2 ± 3 µg |
| 15 | 5/26 | 6 ± 4 µg | 6 ± 9 µg | 2 ± 2 µg |
| 16 | 5/27 | 8 ± 4 µg | 7 ± 10 µg | 3 ± 2 µg |
| 17 | 5/28 | 5 ± 3 µg | 7 ± 9 µg | 8 ± 4 µg |
| 18 | 6/1 | 11 ± 5 µg | 10 ± 11 µg | 13 ± 16 µg |
| 19 | 6/2 | 3 ± 1 µg | 5 ± 8 µg | 2 ± 4 µg |
| 20 | 6/3 | 3 ± 3 µg | 6 ± 11 µg | 1 ± 1 µg |

The foregoing is provided for purposes of illustrating, explaining, and describing embodiments of the disclosure, and are not intended to limit the scope of the disclosure. Modifications and adaptations to these embodiments will be apparent to those skilled in the art and may be made without departing from the scope or spirit of these disclosures.

We claim:

1. An antimicrobial material, comprising:
an antimicrobial layer comprising an antimicrobial agent entrapped within a polymer matrix, wherein the polymer matrix is water stable, wherein the polymer matrix is polystyrene-block-polyisoprene or polystyrene-block-polybutadiene, and wherein the antimicrobial layer has a contact surface and an exposed surface opposite the contact surface, wherein an exposed surface of the antimicrobial layer exhibits sustained-release of the antimicrobial agent entrapped within the polymer matrix to provide antimicrobial properties for at least 7 days measured using an aqueous extraction-based release assay,
wherein the antimicrobial agent comprises thymol wherein a mass ratio of thymol to polymer matrix in the antimicrobial layer is from 1:4 to 1:8, and
the antimicrobial material is a cast film.

2. The antimicrobial material of claim 1, wherein at least one surface of the antimicrobial material comprises adhesive adapted to couple the antimicrobial layer to a touchable surface.

3. The antimicrobial material of claim 1, wherein the mass ratio of thymol to polymer matrix is 1:8.

4. The antimicrobial material of claim 1, wherein the antimicrobial agent further comprises chlorhexidine, cinnamaldehyde, or a combination thereof.

5. The antimicrobial material of claim 1, wherein the antimicrobial agent further comprises an antimicrobial agent selected from the group consisting of eugenol, nisin, chlorhexadine, clove bud oil, cinnamaldehyde, and combinations thereof.

6. The antimicrobial material of claim 1, wherein the antimicrobial agent further comprises at least one of eugenol or cinnamaldehyde.

7. The antimicrobial material of claim 1, wherein the antimicrobial layer further comprises a plasticizer or a sustained-release enhancer selected from the group consisting of poly(vinyl alcohol), polyvinyl acetate, poly(ethylene-co-vinyl alcohol), eudragit, and polyethylene glycol.

8. The antimicrobial material of claim 1, further comprising a substrate, wherein the antimicrobial layer is coupled to at least one surface of the substrate.

9. The antimicrobial material of claim 8, wherein the substrate is an outer surface of an object selected from the group consisting of a phone case, phone cover, a facial tissue holder, a toilet seat, a handle, a door knob, a steering wheel, a steering wheel cover, a furniture surface, a wall surface, a cigarette case, a bed rail, a bed frame, a lamp, a tray table, an IV pole, a blood pressure cuff, and an airplane, train, or bus interior surface.

10. The antimicrobial material of claim 1, wherein the sustained-release antimicrobial properties are selected from the group consisting of antibiotic properties, antiviral properties, antifungal properties, antiparasitic properties, and combinations thereof.

11. The antimicrobial material of claim 1, wherein the mass ratio of thymol to polymer matrix is 1:4.

12. The antimicrobial material of claim 1, wherein the polymer matrix consists of polystyrene-block-polyisoprene.

13. The antimicrobial material of claim 1, wherein the cast film is formed from evaporation of a solvent of a mixture comprising the antimicrobial agent, the polymer matrix, and the solvent from a surface.

14. A method of making an antimicrobial material, comprising:
providing a mixture comprising a solvent, an antimicrobial agent, and polymeric material;
applying the mixture onto a surface; and
evaporating the solvent, wherein after evaporating the mixture forms an antimicrobial layer on the surface, wherein the antimicrobial layer comprises antimicrobial material of claim 1, and wherein the antimicrobial layer has a contact surface and an exposed surface opposite the contact surface, wherein an exposed surface of the antimicrobial layer exhibits sustained-release of the antimicrobial agent entrapped within the polymer matrix to provide antimicrobial properties for greater than 7 days measured using an aqueous extraction-based release test.

15. The method for claim 14, wherein the surface is an outer surface of an object selected from the group consisting of a phone case, phone cover, a facial tissue holder, a toilet seat, a handle, a door knob, a steering wheel, a steering wheel cover, a furniture surface, a wall surface, a cigarette case, a bed rail, a bed frame, a lamp, a tray table, an IV pole, a blood pressure cuff, and an airplane, train, or bus interior surface.

16. An antimicrobial material, comprising:

an antimicrobial layer comprising an antimicrobial agent entrapped within a polymer matrix, wherein the polymer matrix is water stable, wherein the polymer matrix is polystyrene-block-polyisoprene or polystyrene-block-polybutadiene, and wherein the antimicrobial layer has a contact surface and an exposed surface opposite the contact surface, wherein an exposed surface of the antimicrobial layer exhibits sustained-release of the antimicrobial agent entrapped within the polymer matrix to provide antimicrobial properties for at least 7 days measured using an aqueous extraction-based release assay, wherein the antimicrobial agent consists of thymol wherein a mass ratio of thymol to polymer matrix in the antimicrobial layer is from 1:4 to 1:8, and the antimicrobial material is a cast film.

17. The antimicrobial material of claim 16, wherein the cast film is formed from evaporation of a solvent of a mixture comprising the antimicrobial agent, the polymer matrix, and the solvent from a surface.

18. The antimicrobial material of claim 16, wherein the polymer matrix consists of polystyrene-block-polyisoprene.

19. The antimicrobial material of claim 18, wherein the mass ratio of thymol to polymer matrix is 1:8.

20. A method of making an antimicrobial material, comprising:

providing a mixture comprising a solvent, an antimicrobial agent, and polymeric material;

applying the mixture onto a surface; and evaporating the solvent, wherein after evaporating the mixture forms an antimicrobial layer on the surface, wherein the antimicrobial layer comprises antimicrobial material of claim 13, and wherein the antimicrobial layer has a contact surface and an exposed surface opposite the contact surface, wherein an exposed surface of the antimicrobial layer exhibits sustained-release of the antimicrobial agent entrapped within the polymer matrix to provide antimicrobial properties for greater than 7 days measured using an aqueous extraction-based release test.

* * * * *